United States Patent [19]
Cheung et al.

[11] Patent Number: 5,231,580
[45] Date of Patent: Jul. 27, 1993

[54] AUTOMATED METHOD AND APPARATUS FOR DETERMINING CHARACTERISTICS OF NERVE FIBERS

[75] Inventors: Dominic Cheung, Baltimore; Christopher L. Christman, Silver Spring; Nitish V. Thakor, Columbia, all of Md.

[73] Assignee: The United States of America as represented by the Secretary of the Department of Health and Human Services, Washington, D.C.

[21] Appl. No.: 678,918

[22] Filed: Apr. 1, 1991

[51] Int. Cl.$^5$ .............................................. G06F 15/00
[52] U.S. Cl. ..................... 364/413.13; 382/6
[58] Field of Search ............... 364/413.13, 413.01; 128/774; 382/6

[56] References Cited

U.S. PATENT DOCUMENTS

| | | | |
|---|---|---|---|
| 4,331,132 | 5/1982 | Mukasa | 128/745 |
| 4,641,349 | 2/1987 | Flom et al. | 354/62 |
| 4,883,061 | 11/1989 | Zeimer | 128/774 |
| 4,947,323 | 8/1990 | Smith | 364/413.13 |

OTHER PUBLICATIONS

Rutherford et al., "Imaging Techniques implemented on pipeline minis and an array processor with application to nerve fiber counting", 1979.
Savy et al., "An Image Analysis Morphometrie Method for the Study of Myelinated Nerve Fibers from Mouse Trigeminel Root", 1988.
Ziegelmiller et al., "An Heuristic Search Boundary Finding Algorithem for Muscle and Nerve Fiber Images", 1987.
H. Belson et al., "Automatic Computer Measurements of Neurons," *Pattern Recognition*, 1:119-128 (1986).
R. S. Ledley, "High-Speed Automatic Analysis of Biomedical Pictures", *Science*, 146:216-223 (1984).
R. F. Dun, "Quantitative Analysis of Micrographs by Computer Graphics", *Journal of Microscopy*, 105:205-213 (1975).
"On-Line Computerized Entry and Display of Nerve Fiber Cross Sections Using Single or Segmented Histological Records", *Computer and Biomedical Research*, 9:229-237 (1976).
W. J. Geckle, "Computer-Aided Measurements of Transverse Axon Sections for Morphology Studies", *Computer and Biomedical Research*, 16:287-299 (1983).
T. J. Ellis et al., "Automated Measurement of Peripheral Nerve Fibers in Transverse Section", *Journal of Biomedical Engineering*, 2:272-280 (1980).
M. J. Eccles, "A Programmable Flying-Spot Microscope and Picture Pre-Processor", *Journal of Microscopy*, 106:33-42 (1976).
J. Adhami et al., "Morphometric Studies on the Studies on the Relationship Between Myelin Sheath and Axon Area in the Sciatic Nerve of Adult Rats", *Anatomischer Anzeiger*, 140:52-61 (1976).
M. H. Eccles et al., "Analysis of Digitized Boundaries of Planar Objects", *Pattern Recognition*, 9:31-41 (1977).

Primary Examiner—Roy N. Envall, Jr.
Assistant Examiner—Laura Brutman
Attorney, Agent, or Firm—Lowe, Price, LeBlanc & Becker

[57] ABSTRACT

An automated method and apparatus determines characteristics of nerve fibers. The apparatus includes an imaging unit that creates a digital image data representative of an image of a cross-section of a nerve fiber to be tested; a control unit, including image processing capability, is coupled to the imaging unit and analyzes the digital image data created by the imaging unit to identify particular characteristics of the nerve fibers including axon area, the myelin sheath area, the fiber area, the myelin sheath thickness, the fiber perimeter and the fiber eccentricity.

15 Claims, 20 Drawing Sheets

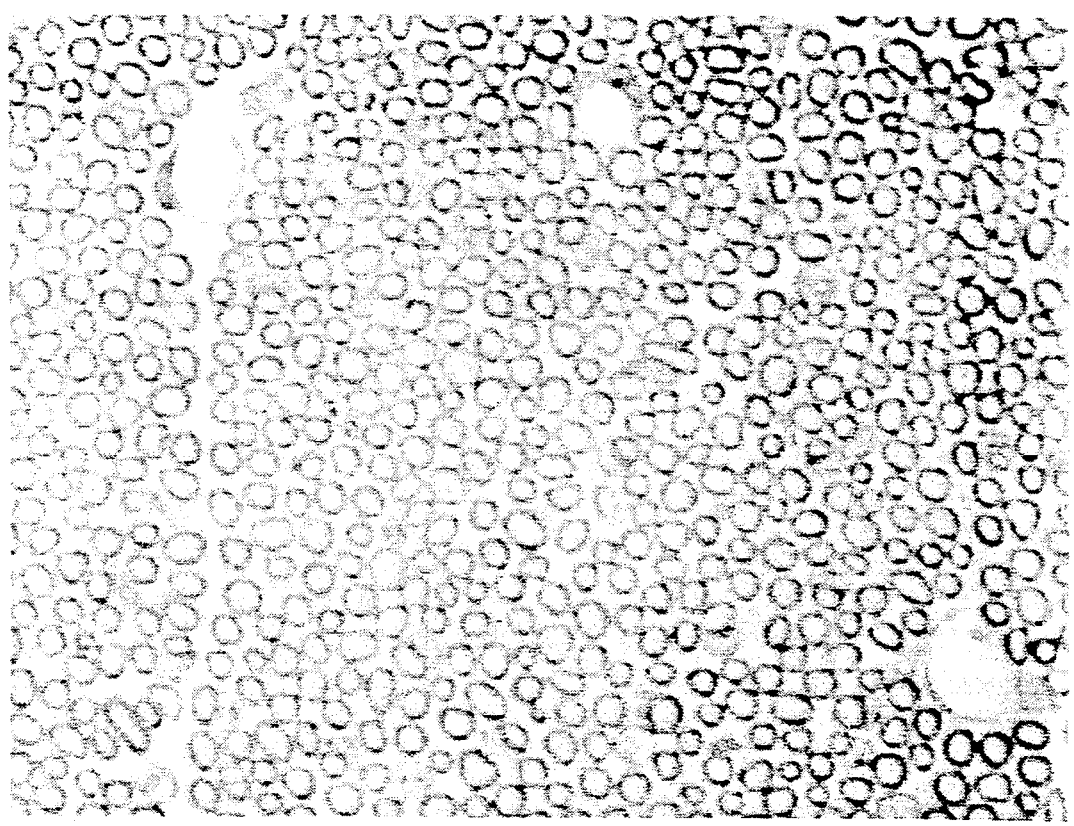
FIG. 1.1

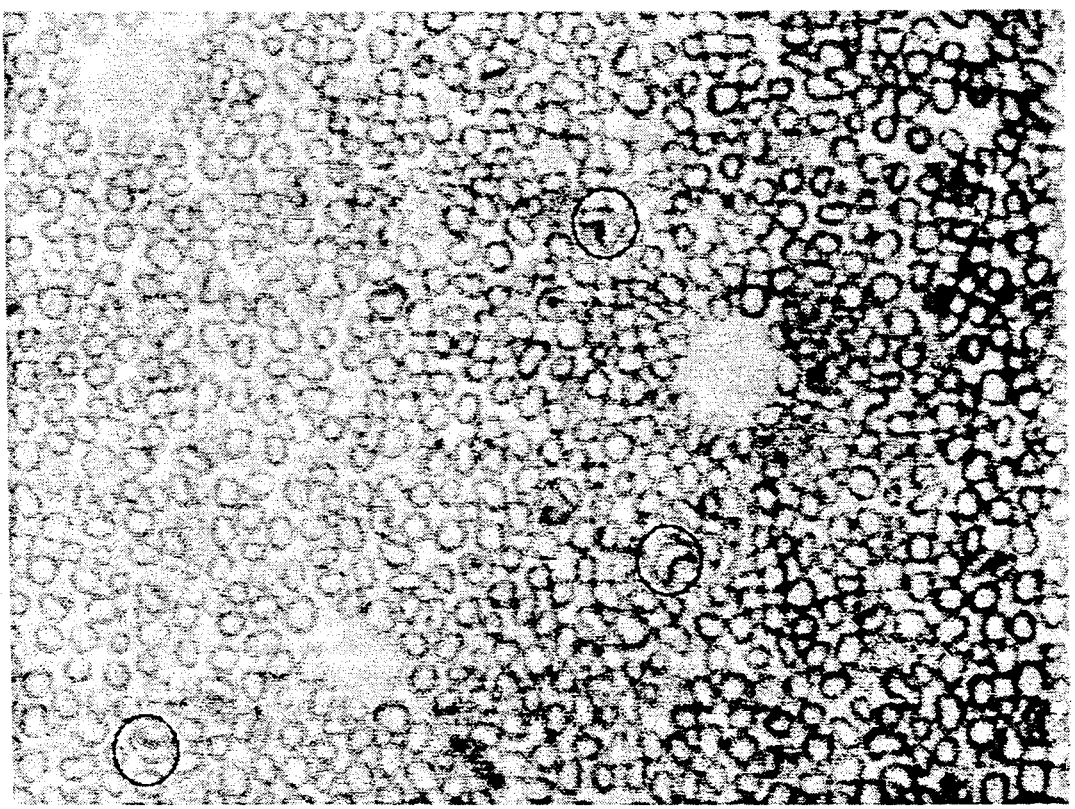
FIG. 1.2

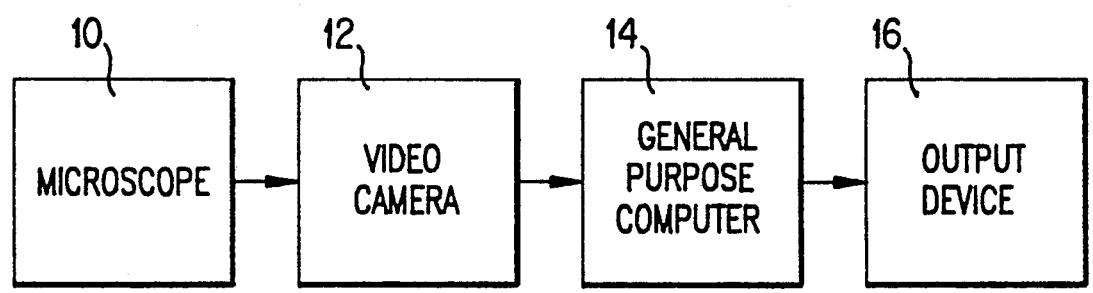
FIG.2.1
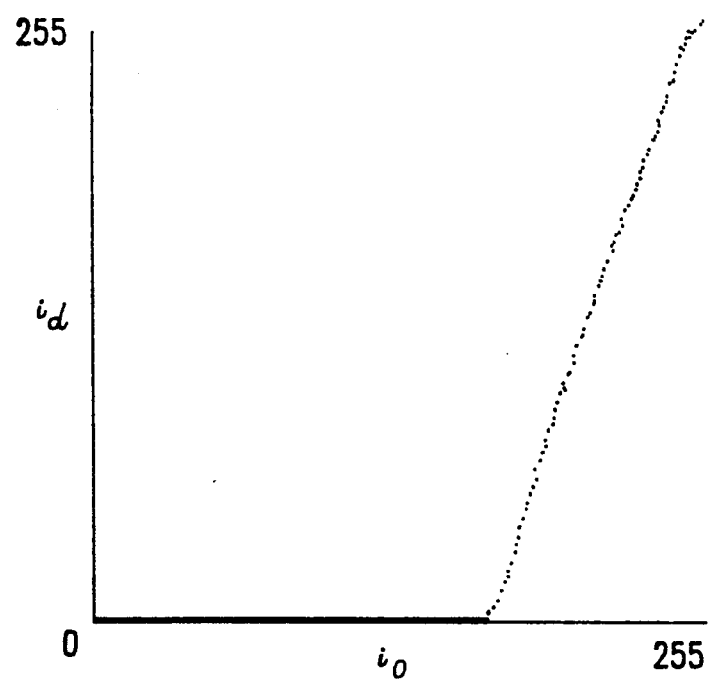
FIG.3.1(e)

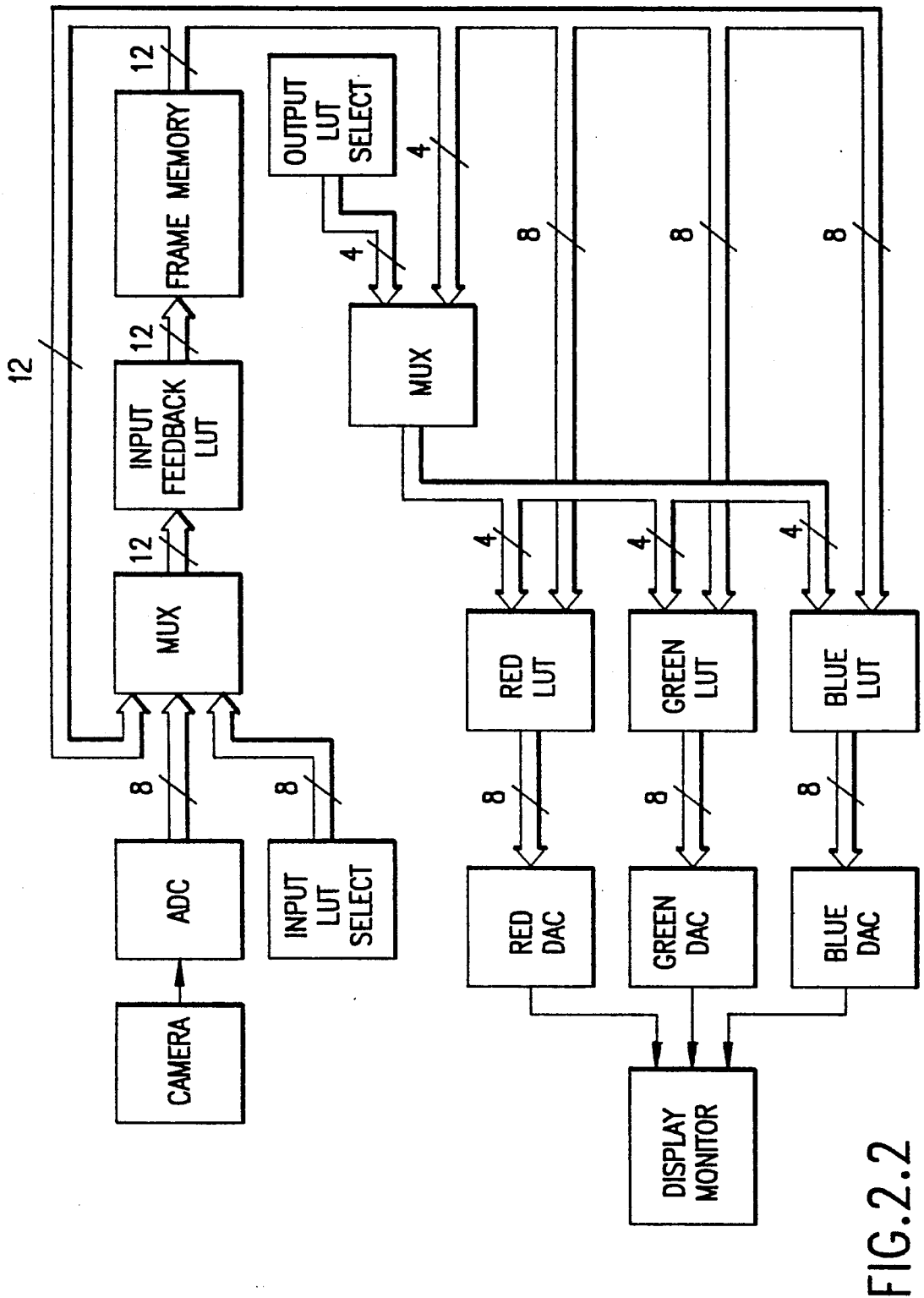
FIG.2.2

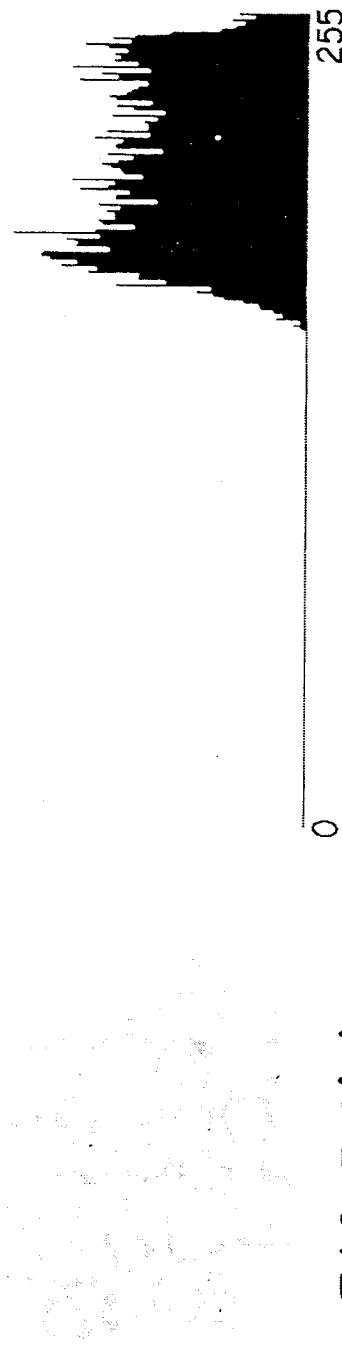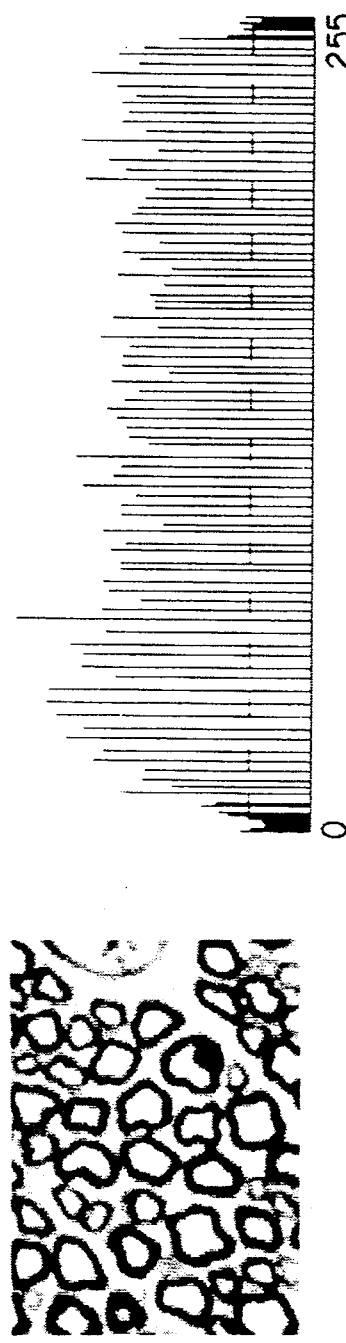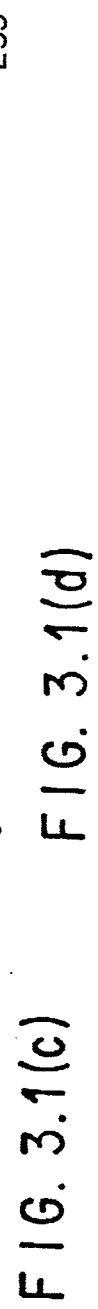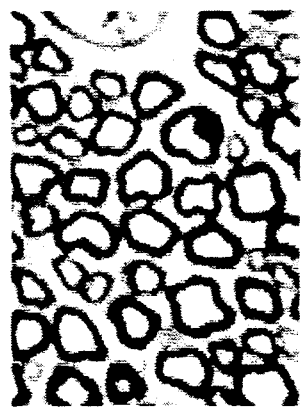
FIG. 3.1(a) FIG. 3.1(b) FIG. 3.1(c) FIG. 3.1(d)

| 8 | 4.8 | 8 |
|---|---|---|
| 4.8 | P | 4.8 |
| 8 | 4.8 | 8 |
FIG.4.1
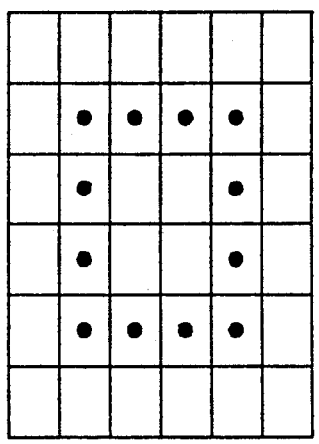
FIG.4.2(a)
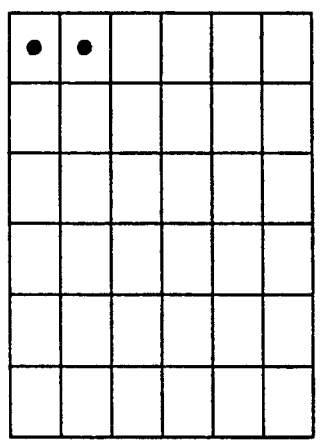
FIG.4.2(b)
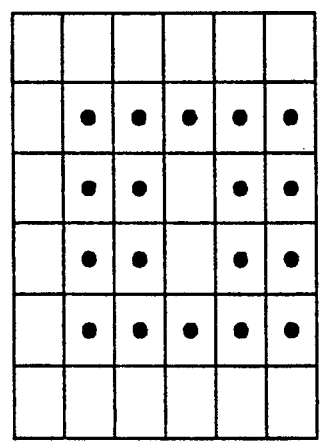
FIG.4.2(c)
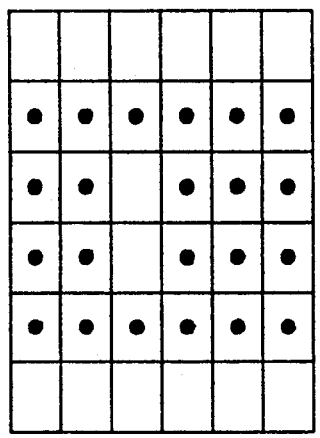
FIG.4.3(a)
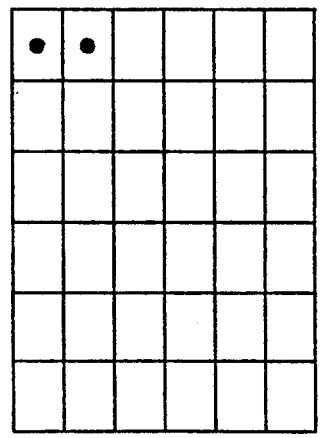
FIG.4.3(b)
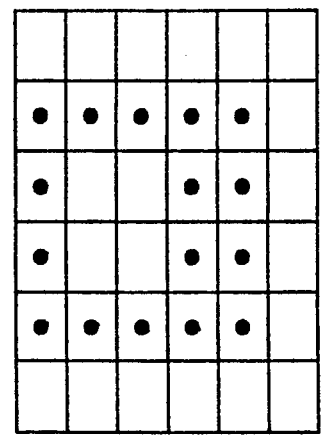
FIG.4.3(c)

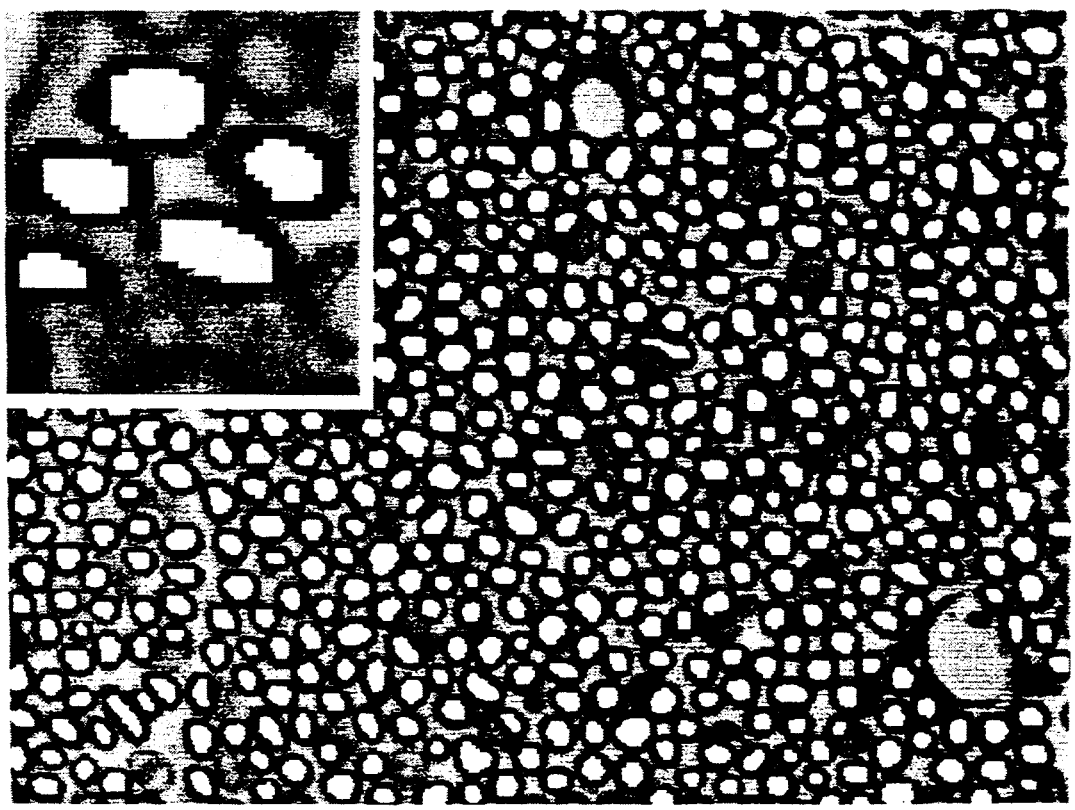
FIG. 5.1

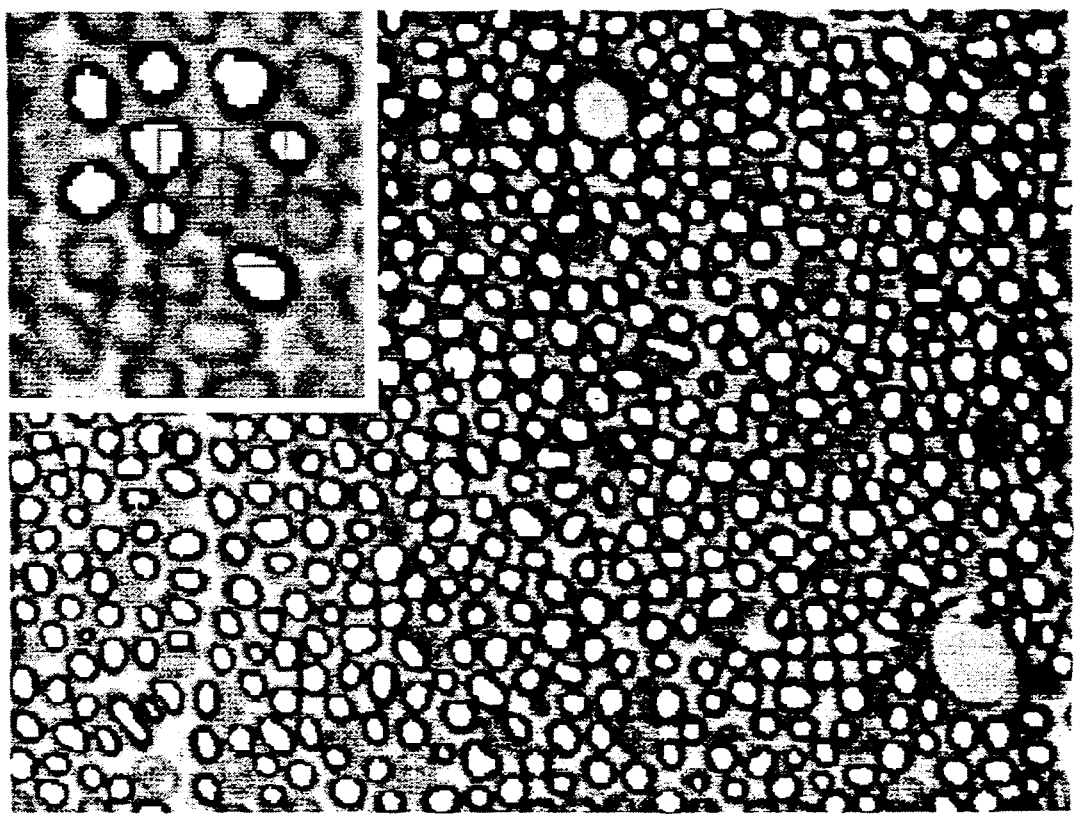
FIG. 5.2

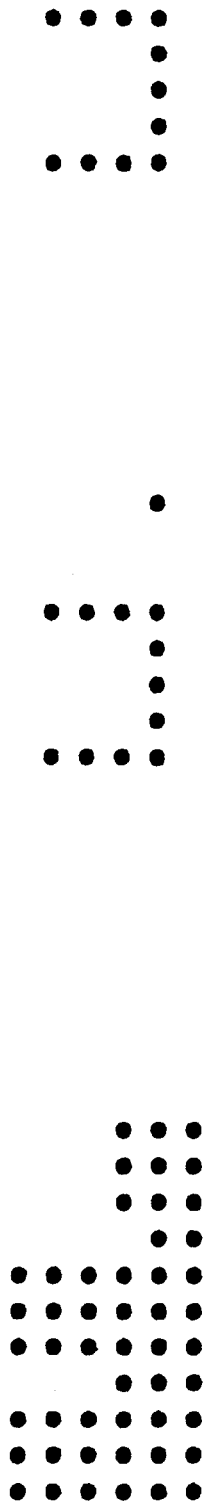
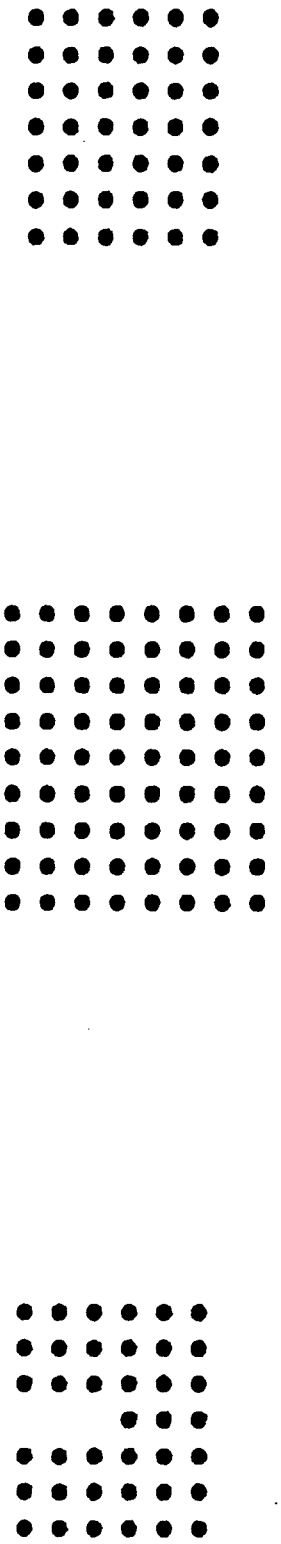
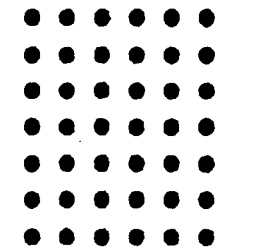
FIG.5.3(a) FIG.5.3(b) FIG.5.3(c) FIG.5.3(d) FIG.5.3(e) FIG.5.3(f)

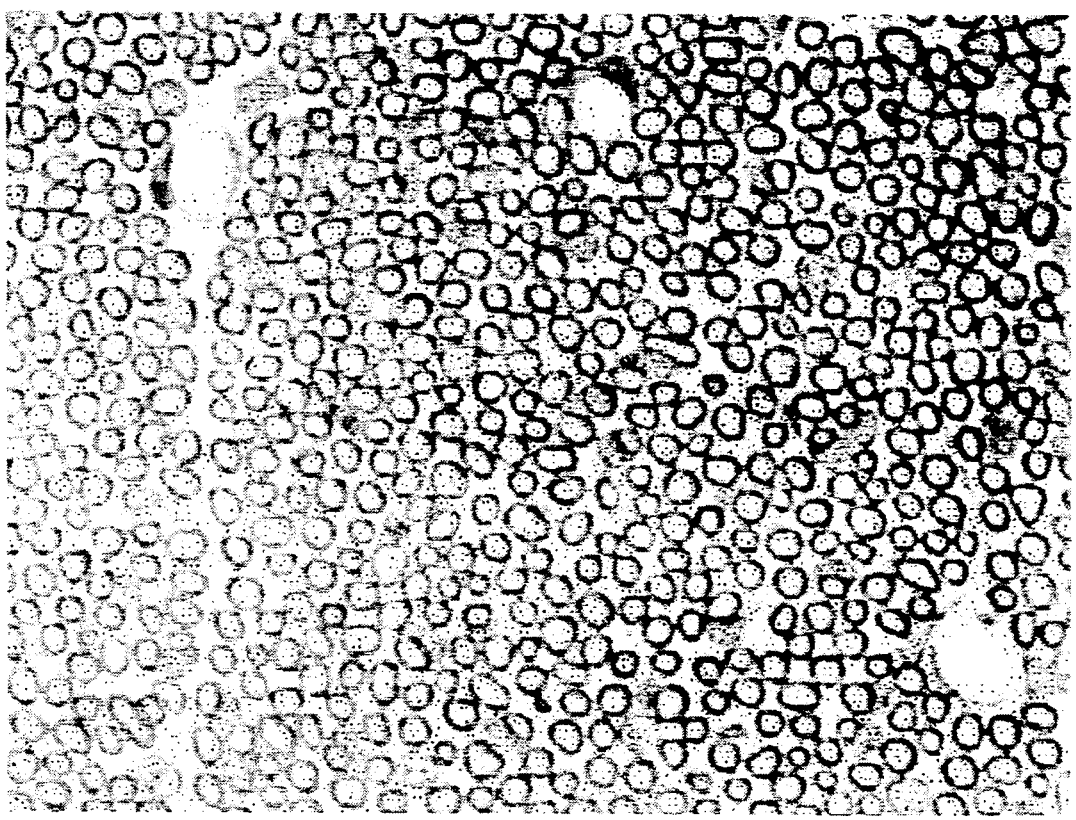
FIG. 5.4

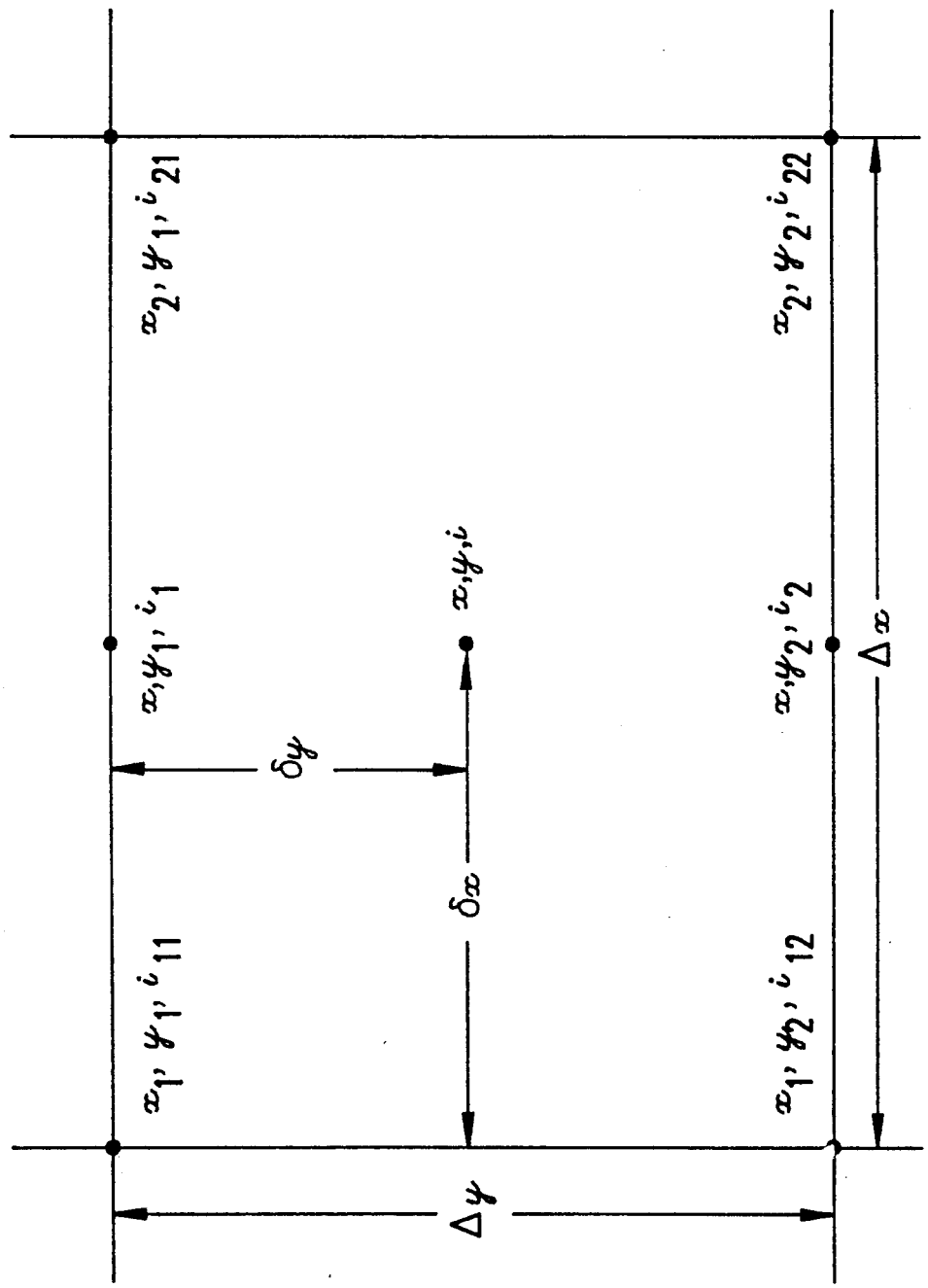
FIG.5.5

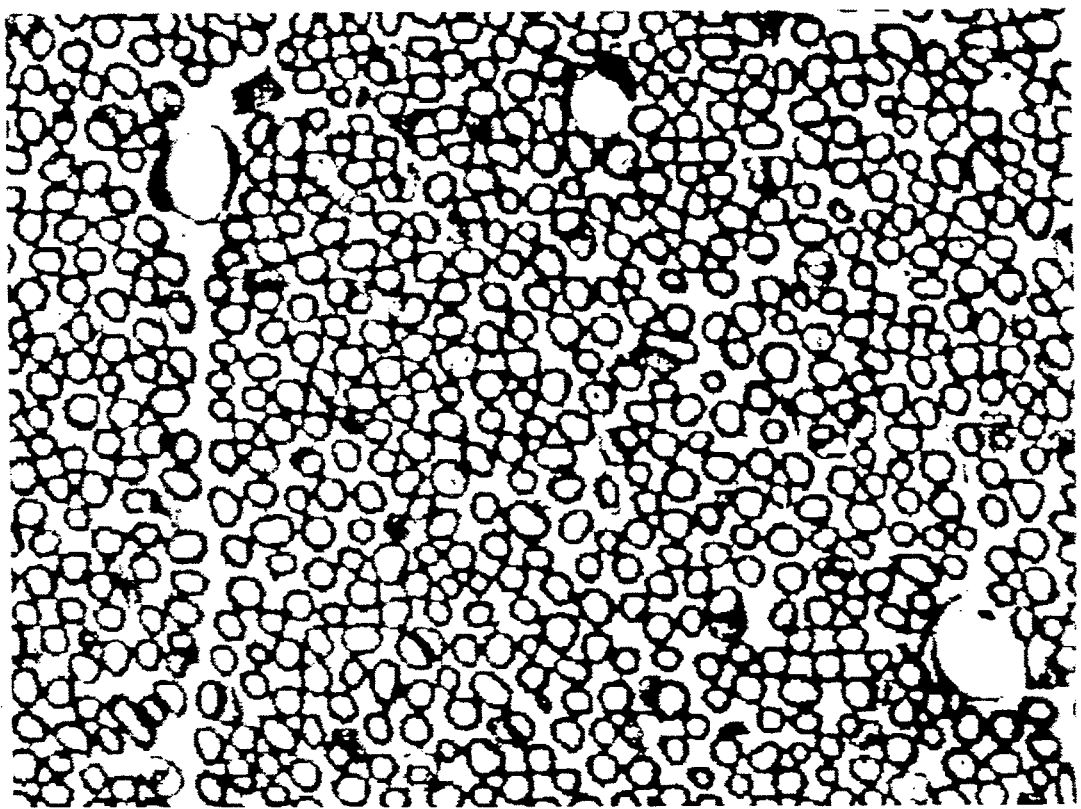
FIG. 5.6

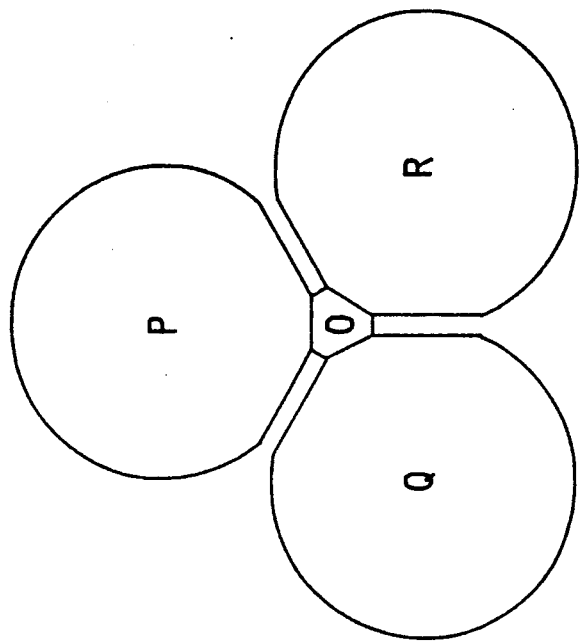
FIG.5.7(b)
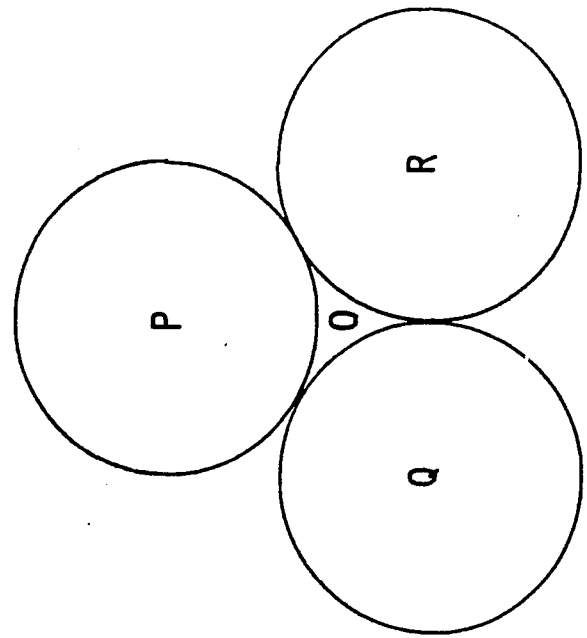
FIG.5.7(a)

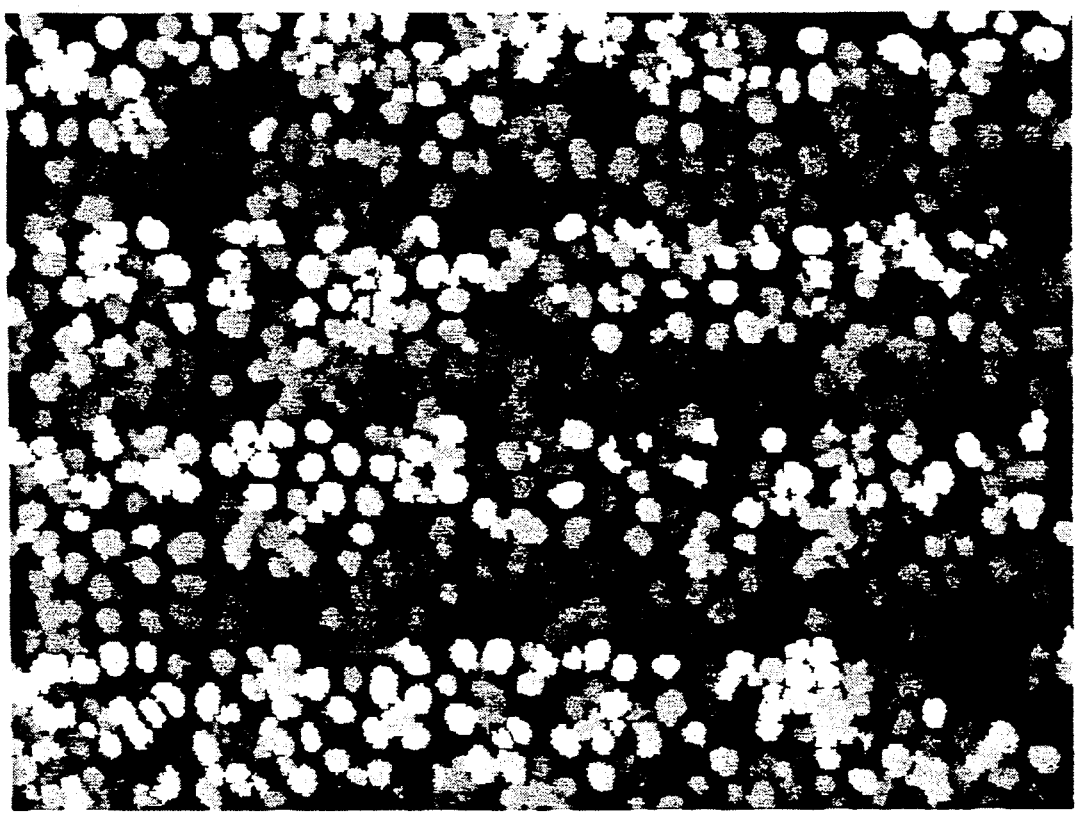
FIG. 5.8

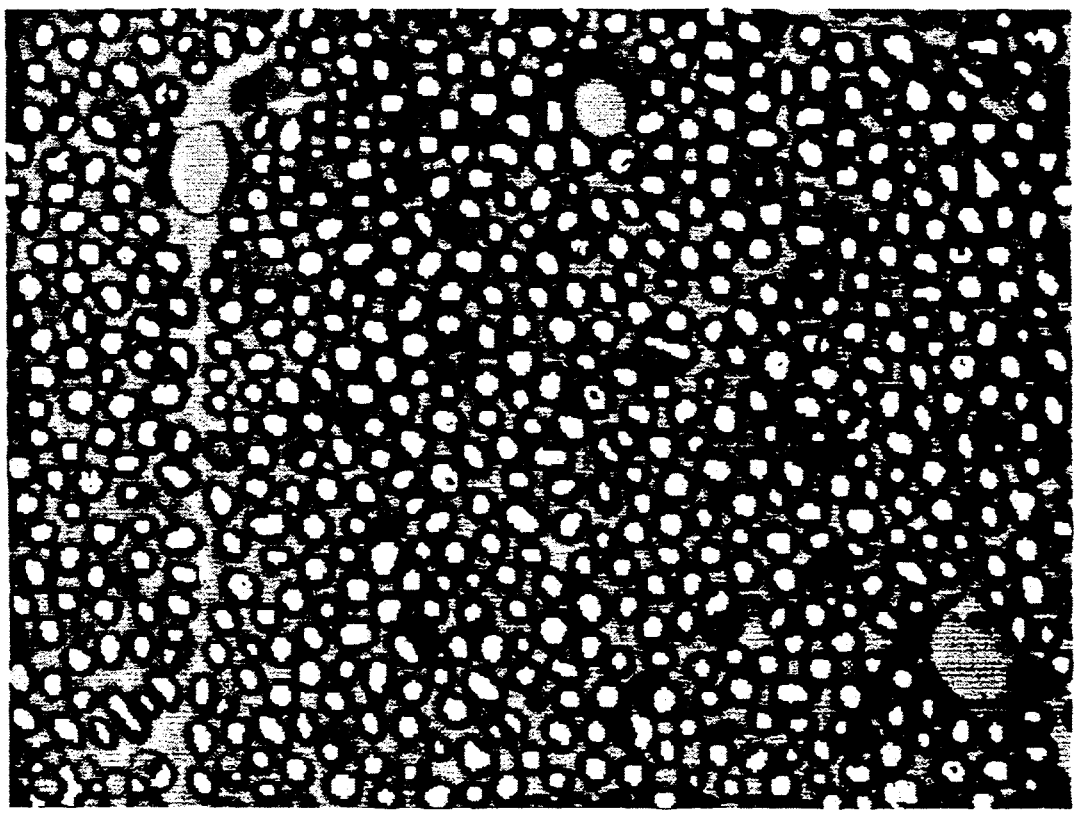
FIG. 5.9

| TRIAL | TIME REQUIRED (MINUTES) | FIBERS COUNTED | AVERAGE AXON AREA (SQUARE UNITS) | AVERAGE MYELIN SHEATH THICKNESS (UNITS) | AVERAGE ECCENTRICITY |
|---|---|---|---|---|---|
| MANUAL (1) | 110 (SKILLED) | 563 | 69.6 | 2.61 | 12.7 |
| MANUAL (2) | 132 | 567 | 68.5 | 3.00 | 13.3 |
| MANUAL (3) | 230 (UNSKILLED) | 560 | 68.4 | 3.19 | 13.3 |
| MANUAL (AVERAGE) | 110-230 | 565 | 67.2 | 2.92 | 13.1 |
| AIDED (1) | 16 (SKILLED) | 564 | 62.7 | 2.21 | 12.9 |
| AIDED (2) | 18 | 560 | 58.5 | 2.33 | 12.8 |
| AIDED (3) | 25 (UNSKILLED) | 563 | 61.9 | 2.24 | 12.9 |
| AIDED (AVERAGE) | 16-25 | 565 | 61.5 | 2.20 | 12.9 |
| AUTO | 4.8 | 581 | 58.1 | 2.21 | 12.9 |

FIG.6.1

| SECTION | NORMAL | | | | AFTER STIMULATION | | | |
| --- | --- | --- | --- | --- | --- | --- | --- | --- |
| | 1 | 2 | 3 | AVERAGE | 4 | 5 | 6 | AVERAGE |
| FIBER COUNT | 581 | 589 | 715 | 628 | 682 | 621 | 597 | 633 |
| AVERAGE AXON AREA (SQUARE UNITS) | 58.1 | 55.1 | 46.6 | 53.3 | 42.2 | 35.7 | 40.3 | 39.4 |
| AVERAGE MYELIN SHEATH THICKNESS (UNITS) | 2.21 | 2.23 | 2.06 | 2.17 | 2.08 | 2.25 | 2.14 | 2.16 |
| AVERAGE ECCENTRICITY | 12.9 | 12.8 | 12.4 | 12.7 | 12.9 | 12.8 | 13.2 | 13.0 |
| STANDARD DEVIATION OF ECCENTRICITY | 1.03 | 0.82 | 0.71 | 0.85 | 1.05 | 1.06 | 1.31 | 1.14 |

FIG.6.2

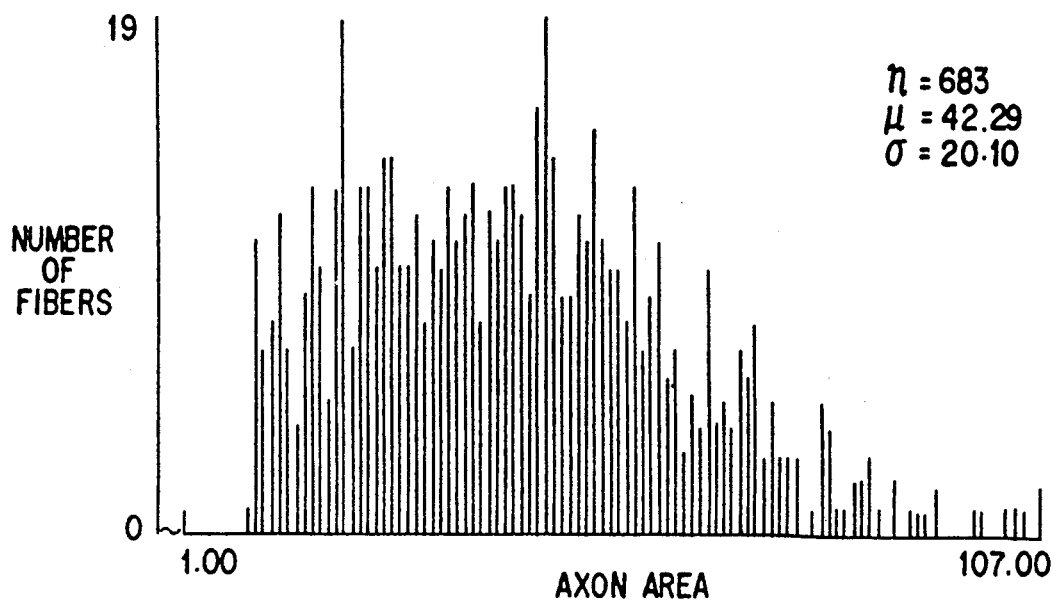
FIG. 6.3 (a)
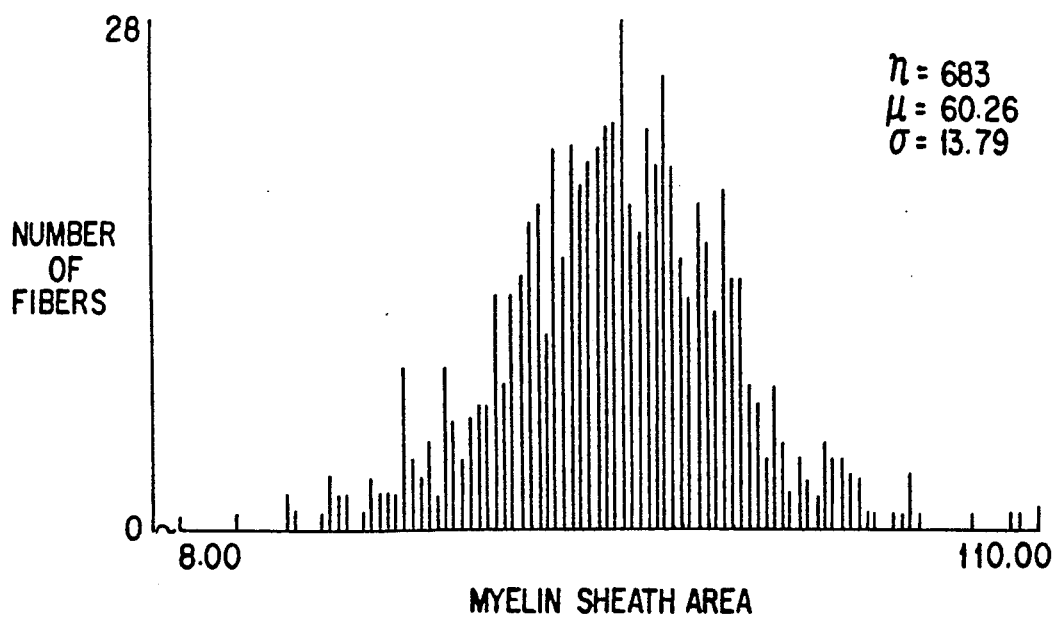
FIG. 6.3 (b)

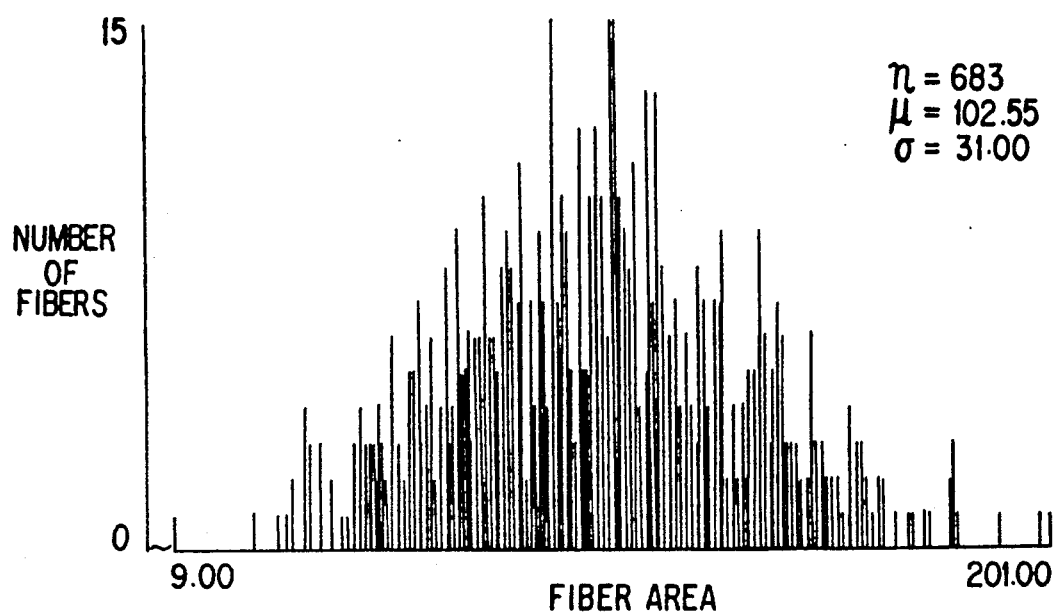
FIG.6.3(c)
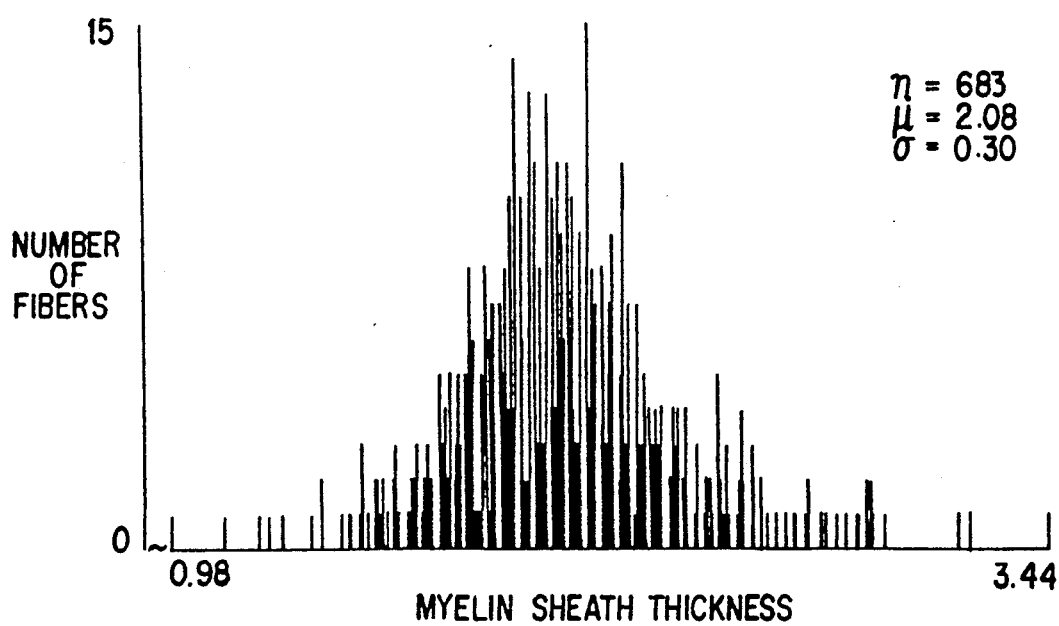
FIG.6.3(d)

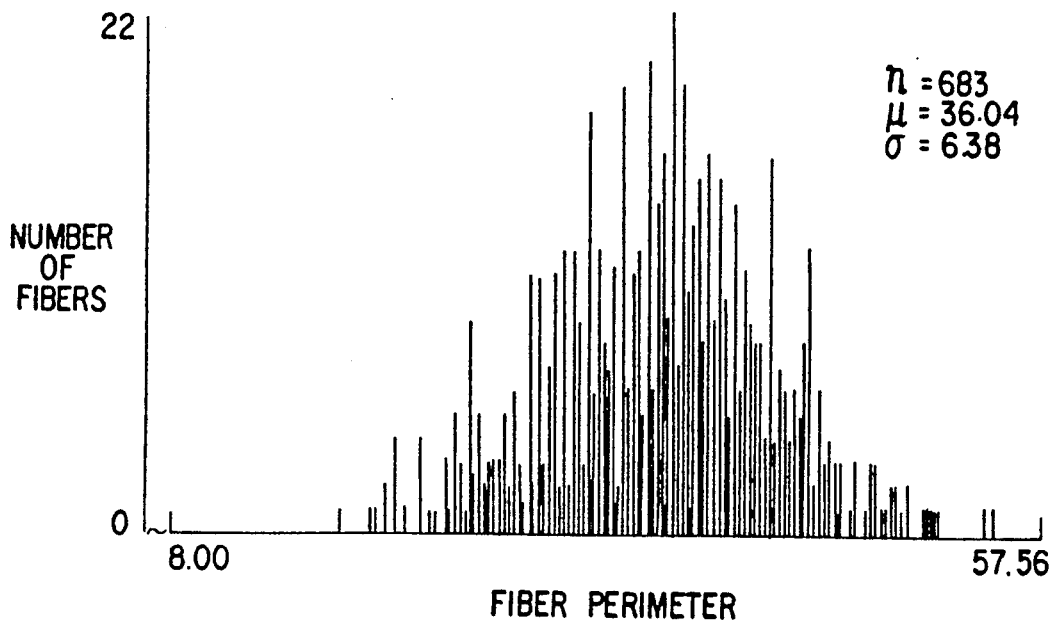
FIG. 6.3(e)
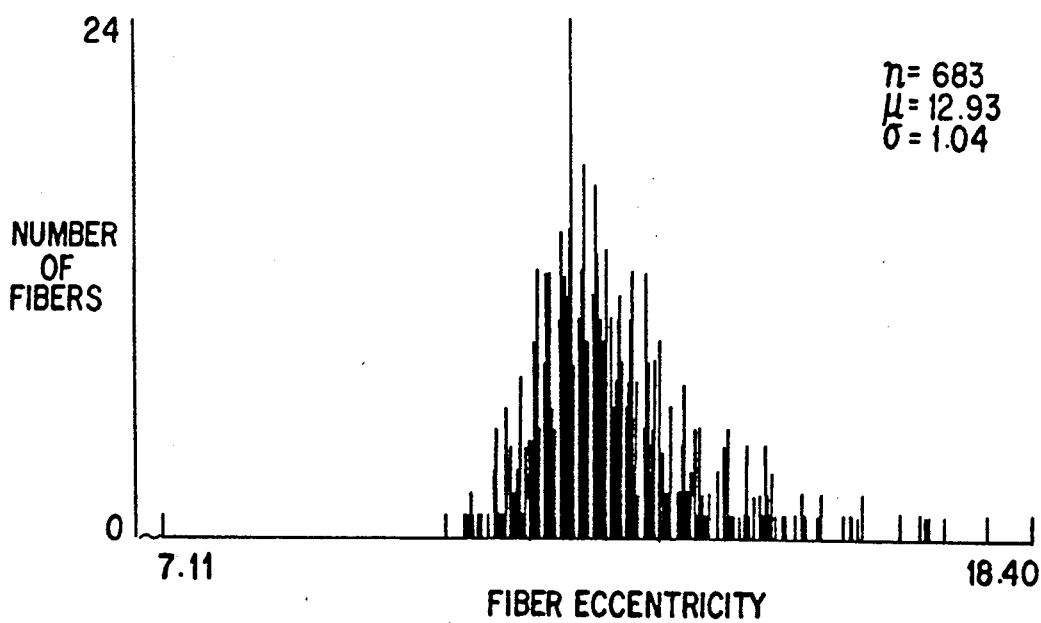
FIG. 6.3(f)

AUTOMATED METHOD AND APPARATUS FOR DETERMINING CHARACTERISTICS OF NERVE FIBERS

BACKGROUND OF THE INVENTION

The present invention is directed to an automated method and apparatus for evaluating fibers in a neurological system. In particular, the invention is directed to an automated method and apparatus that employs image analysis techniques to identify and count the number of myelinated nerve fibers in a nerve cross-section.

The problem of studying nerve fiber cross sections quantitatively arises frequently in the field of neuroscience. Parameters such as axon diameter, myelin sheath thickness, eccentricity and nerve fiber density are useful in many different research areas. Measurements of axon diameters and myelin sheath thicknesses have proven to be of great importance in developing mathematical models to describe the conduction properties of myelinated nerve fibers. The conduction velocity of nerve impulses in a nerve fiber can be estimated from the axon diameter, the myelin sheath thickness, and the internode distances.

By performing such measurements on a statistically significant number of nerve fibers in a nerve bundle, and analyzing the distributions of fiber size and shape, neurologists can also draw conclusions about the anatomy and physiology of the nervous system. This information is significant in assessing the damage to a nerve due to natural or experimental causes.

The diameters of the axons and the thicknesses of the myelin sheaths have previously been measured using manual techniques and the results entered into a computer for processing and storage. Manual measurement, however, is a very time-consuming process because such analyses involves a large number of nerve fibers, usually in the range of 1,000 to 3,000 for each transverse nerve section. Human errors are unavoidable in such a laborious task. Moreover, manual observation of objects seen under a microscope often calls for subjective judgments and decisions which causes inconsistent results when several microscope operators are employed on a single project.

Attempts have been made in the past to automate the process described above. For example, Belson, Dudley and Ledley reported in 1968 the use of computer to automatically measure the size of neurons. The system employed an IBM 7094 computer equipped with a FIDAC scanning instrument. See, "Automatic Computer Measurements of Neurons" by M. Belson et al., Pattern Recognition, 1:119-128, 1986"; and "High-speed Automatic Analysis of Biomedical Pictures", by R. S. Ledley, Science, 146:216-223, 1964. The system was designed to measure the size of the nucleus and the perikaryon of the neuron, from which information the cell volume is derived.

In 1975, Dunn, O'Leary and Kumley described a system developed to count nerve fibers. See, "Quantitative Analysis of Micrographs by Computer Graphics", R. F. Dunn et al., Journal of Microscopy, 105:205-213, 1975; and "On-line Computerized Entry and Display of Nerve Fiber Cross Sections Using Single or Segmented Histological Records", Computer and Biomedical Research, 9:229-237, 1976. Each fiber in this system was characterized by eight points input manually by the operator through a graphics tablet. Four of those points were used to indicate the outer boundary of the myelin sheath and the remaining four were used for the boundary of the axon. The computer system then searched for the best set of two concentric circles to represent that particular fiber. The process, however, involved mostly manual tasks and the computer was not responsible for the detection of nerve fibers in an image or the shape analysis of the nerve fibers. Instead, the computer merely searched for the set of concentric circles which best matched the eight points input by the operator. Thus a mistake made by the operator would result in an incorrect output from the computer.

A similar method was used by Geckle and Jenkins to automatically trace the boundary of the axon. See, "Computer-aided Measurements of Transverse Axon Sections for Morphology Studies", by W. J. Geckle and R. E. Jenkins, Computer and Biomedical Research, 16:287-299, 1983. The user, however, has to provide an arbitrary starting point somewhere inside the axon via a digitizing tablet. In other words, the detection of the nerve fibers is manual, while the shape of nerve fibers is traced automatically. The algorithm used is a variation to the blob counting method described in *Computer Vision*, by D. H. Ballard and C. M. Brown, Prentice-Hall, Englewood Cliffs, N.J.

A more sophisticated system has been developed by Ellis, Rosen and Cavanagh. See, "Automated Measurement of Peripheral Nerve Fibers in Transverse Section", by T. J. Ellis et al., Journal of Biomedical Engineering, 2:272-280, 1980; and "A Programmable Flying-spot Microscope and Picture Pre-processor", by M. J. Eccles et al., Journal of Microscopy, 106:33-42, 1976. This system attempts to locate the nerve fibers by the blob counting algorithm, then it examines each located object to determine whether or not it is a conjugated set of nerve fibers. If it is, the object is segmented. On the other hand, if the object is determined to be a single fiber or an inter-fiber hole, a circularity test decides whether it should be classified as a fiber, based on the assumption that axons in general are circular and that inter-fiber holes usually contain irregular protrusions and can be rejected by testing for circularity.

The different schemes described above were designed to deal with one very special category of histological slides—those containing circular objects. A certain degree of automation is achieved in each method, but all of them require manual inputs of some sort which is undesirable for the reasons previously stated. Full automation of the process, however, presents a very difficult set of problems that have not been addressed by the conventional methods described above.

In general, the procedure of analyzing the histological slide images can be broken down into two parts. First, the objects have to be identified. This is difficult to automate because the computer has to be programmed to understand an image which is no more than a very large set of pixels with different intensity values, requiring immense computational effort and capacity. Second, morphological data are obtained from the identified objects, a step which is very dependent on the success of the identification step.

One of the similarities in most of the previous attempts is to start with a manual thresholding, which converts a gray level image into a one-bit image—an image which consists only of boundary (myelin sheath) and non-boundary (axon or intercellular space) pixels. The advantage in using manual thresholding is that analyzing one-bit images is much easier than analyzing gray scale images since the axon boundaries in 1-bit images are clearly defined. However, manual thresholding has its own shortcomings. Namely, the results of manual thresholding are undesirably inconsistent and not reproducible in general.

The detection of the objects in all the previous works described requires successful thresholdings. The objects can easily be detected by using blob counting if they are nicely separated from each other. This is usually not the case in practice, however, as the images of the nerve fibers often appear to be clumped together due to the high packing density of the nerve fibers and the limited resolving power of the light microscope. A segmentation algorithm must therefore be employed as each cluster will be identified as one object using blob counting.

The above described situation can be improved by using electron micrographs instead of light micrographs. See, "Morphometric Studies on the Studies on the Relationship Between Myelin Sheath and Axon Area in the Sciatic Nerve of Adult Rats", by J Ashami et al., Anatomischer Anzeiger, 140:52-61, 1976. A higher magnification, however, requires a larger number of slides to cover the same region and therefore decreases the efficiency of the system. The location of the objects also turns out to be quite complicated and time-consuming.

Of the four groups described above, only Ellis et al. have attempted to solve this problem. Their algorithm segments an object based on the local curvature along the boundary. The local curvature is first smoothed by a convolution procedure as described in "Analysis of Digitized Boundaries of Planar Objects:, by M. J. Eccles et al., Pattern Recognition, 9:31–41, 1977. Turning points of local curvatures are identified as nodes. Nodes are matched to specify lines along which the object is segmented. The matching is dependent on the orientation, and the absolute distance between, the nodes.

There are several disadvantages associated with the above-described procedure. For example, it is not clear how many smoothing convolutions are needed. Further, the segmentation algorithm assumes the boundaries of the objects to be continuous. The segmentation algorithm, however, is employed after a single level manual thresholding that has been found to produce a significant amount of discontinuities in the object boundaries. Measurement of identified objects is also the last part of the automatic analysis which involves boundary tracing that traditionally employs the blob analysis. Obviously, if segmentation were unsatisfactory, the blob counting that followed would be unsuccessful.

It is therefore an object of the present invention to overcome the deficiencies of the prior art methods and systems discussed above by providing a system that is capable of digitizing images of histological slides from the cross-section of cochlear nerves, counting the number of myelinated nerve fibers in each slide, obtaining morphological statistics about the nerve fibers (including axon area, myelin sheath thickness, fiber eccentricity, etc.) and assessing the damage of cochlear nerves due to natural or experimental causes, including damages induced by electrical stimulation as in cochlear implants.

A further object of the invention is to provide a system that can employ a relatively low cost, general purpose computer and use the lowest possible magnification in order to include as many nerve fibers in one frame as possible, so that the number of frames needed to be processed will be reduced to a minimum.

A still further object of the invention is to provide a system that can accomplish the above-noted function at a reasonable speed and accuracy, and with a reduction in the amount of human inputs.

SUMMARY OF THE INVENTION

A method and apparatus is disclosed for determining characteristics of nerve fibers. The apparatus includes an imaging unit that creates a digital representation of an image of a cross-section of a nerve fiber to be tested, and a control unit. The control unit includes image processing capability, and is coupled to the imaging unit. The control unit analyzes the digital image data created by the imaging unit to identify particular characteristics of the nerve fiber.

In operation, digital image data representative of an image of a nerve fiber cross-section are generated by the imaging unit, for example an electronic camera, and are stored for processing by the control unit. The control unit accesses the stored digital image data to locate local maxima of the digital image data, performs a variable thresholding operation, refines the local maxima, defines a plurality of blob image regions using blob coloring, and performs an elimination operation to identify which of the blob image regions represent nerve fibers. The control unit further calculates at least one of the axon area, the myelin sheath area, the fiber area, the myelin sheath thickness, the fiber perimeter and the fiber eccentricity of the blob image regions that represent nerve fibers. A unique analysis based on eccentricity characteristics is used to eliminate blob regions that are not axons.

BRIEF DESCRIPTION OF THE DRAWINGS

With the above as background, reference should now be made to the following detailed description of the invention with reference to the accompanying drawings, in which:

FIG. 1.1 illustrates a cross-section of a normal cochlear nerve from a guinea pig;

FIG. 1.2 illustrates a cross-section of a cochlear nerve from a guinea pig after electrical stimulation;

FIG. 2.1 illustrates a block diagram of a system in accordance with the present invention;

FIG. 2.2 illustrates a block diagram of a FG-100-AT-1024 image processor board employed in the system illustrated in FIG. 2.1;

FIGS. 3.1(a)–(e) illustrate histogram equalization wherein FIG. 3.1 (a) represents an original image, FIG. 3.1(b) its histogram, FIG. 3.1(c) a processed picture, FIG. 3.1(d) its histogram and FIG. 3.1(e) a mapping function;

FIG. 4.1 shows the 4-connected and 8-connected neighbors of a point P;

FIG. 4.2 shows an example of dilation;

FIG. 4.3 shows an example of erosion;

FIG. 5.1 illustrates the selection of a region in a MANUAL operation mode;

FIG. 5.2 illustrates the selection of a fiber in an AIDED mode of operation;

FIGS. 5.3(a)–(f) illustrate a process of disconnecting a fiber from its neighbors and smoothing a fiber boundary;

FIG. 5.4 illustrates obtained local maxima;

FIG. 5.5 illustrates a 16×12 image region;

FIG. 5.6 illustrates a thresholded image;

FIGS. 5.7(a)-(b) represent a model of connection between fibers and inter-fiber holes;

FIG. 5.8 shows an image of a nerve section after blob coloring;

FIG. 5.9 shows the completed result of a nerve section counted by the AUTO mode of operation;

FIG. 6.1 is a table which illustrates the results obtained from the system illustrated in FIG. 2.1 in the MANUAL, AIDED and AUTO modes of operation;

FIG. 6.2 is a table which illustrates the analyses of six histological sections using the AUTO mode of operation—three from normal nerve and three from electrically stimulated nerves; and FIG. 6.3(a)-(f) illustrate six parameters generated by the AUTO mode of operation for the image illustrated in FIG. 1.2.

DETAILED DESCRIPTION OF THE INVENTION

Additional background information will be presented prior to discussing the specific structural and functional details of the invention, in order to provide additional basis for understanding the operation of the invention. The background material relates to the desirability of producing a system capable of identifying degeneration of the cochlear nerve. It should be understood, however, that the present invention is not limited to this particular application, but is applicable broadly to many applications, including, for example, peripheral and central nerve cross-sections, cytology automation, red and white blood cell counts, muscle fiber analysis, cell culture colony counting and analysis of an image consisting of closely-packed circular objects.

1.0 Background

As stated above, the problem of studying nerve fiber cross sections quantitatively arises frequently in the field of neuroscience. For example, neurobiologists have long been interested in the size distribution and the regional differences of the cochlear nerve fibers. The neurobiologists associated the degeneration of the cochlear nerve with morphological changes in the nerve fibers as well as the changes in the size of the nerve fiber population.

One of the reasons for studying the cochlear nerve in particular stems from the recent rapid developments in cochlear implants. The possibility of the perception of sound became a reality for profoundly deaf individuals with the approval by the FDA of the first cochlear implant device in November 1984. Even when hearing is lost, some spiral ganglion cells may remain which can be electrically stimulated to produce the sensation of hearing.

It has been found, however, that chronic electrical stimulation may result in substantial tissue damage. See, for example, "Mechanisms of Electrically Induced Damage After Cochlear Implantation", Annals of Otology, Rhinology and Laryngology, 95:185-189, 1986. As successful implants require healthy spiral ganglion cells and cochlear nerve fibers, a measure of merit for cochlear prostheses would be an assessment of the degree of cochlear nerve survival after simulation. One way to do this is would be to count the number of surviving cochlear nerve fibers from the cross-sectional view of the cochlear nerve.

The difference between normal cochlear nerve fibers and damaged cochlear nerve fibers will be illustrated with reference to two sets of histological slides analyzed. One set contains transverse cross-sections of cochlear nerve from normal guinea pigs. The other set is from guinea pigs which have undergone a variable amount of cochlear electrical stimulation. Two-micron thick sections are obtained every 100 microns along the cochlear nerve in such a way that the cochlear nerve fibers appear as circular as possible.

A cross-section of a cochlear nerve from a guinea pig is illustrated in FIG. 1.1. The myelin sheaths of the nerve fibers appear dark when stained with toluidine blue. The nerve fiber diameters range from 2-4 $\mu$m with an average of about 3 $\mu$m. The nerve fibers are mostly circular and are innervated by blood vessels which appear as circular but significantly large structure.

A similar cross-section from a cochlear nerve of a guinea pig after electrical simulation is shown in FIG. 1.2. Abnormal crescent-shaped fibers can be seen. The presence of these irregular fibers is may be due to the activities of microglia—an assortment of phagocytic cells that are normally at rest. Under pathological conditions they change to reactive microglia and form processes which pinch into the neurons.

2.0 System Structure

Referring now to FIG. 2.1, a block diagram of a system capable of accurately and automatically identifying healthy nerve fibers from damaged nerve fibers quickly and economically is disclosed. The system includes a microscope 10, a video camera 12, a general purpose computer 14 equipped with a special purpose image processing board, and an output device 16 such as graphics monitor or printer. Each of the different components will be discussed in greater detail below.

2.1 Microscope

The analysis of cochlear nerve fibers is a tedious task because of the large number of miniature fibers present. For example, the average number of cochlear nerve fibers in the guinea pig is as many as 24,000, most of which range from 2-$\mu$m in diameter. Electron microscopes are often used in this kind of analysis in order to gain the required resolution. For example, it is necessary to be able to resolve to about one eighth of the diameter of a fiber. That means the image should be magnified to such a degree that about 8 pixels span the diameter of each fiber. A decrease in resolution may blur the image and present problem to any computer algorithm that attempts to extract features from the image. An increase in resolution which can only be achieved by using the electron microscope, however, results in a much higher processing time and reduces the number of nerve fibers that can be processed per frame.

Since the objects being considered are very small, it is important to obtain the necessary resolution. The resolution acquirable by a compound microscope is $$R = \frac{0.61\lambda}{N} \tag{2.1}$$

where $\lambda$ is the wavelength of the light used and N is the numerical aperture of the objective:

$$N = n \sin u \tag{2.2}$$

where u is the half angular aperture of the objective and n is the refractive index of the medium.

If it is assumed that the smallest fiber considered is 2 μm in diameter, then the resolution required will be $$R = \frac{2}{8} \mu m \qquad (2.3)$$
$$= 0.25 \mu m$$

If white light is utilized, the applicable wavelength would be for green (550 nm), which is at the middle of the visible spectrum and the region of highest acuity. The numerical aperture required according to Equation (2.1) is $$N = \frac{0.61\lambda}{R} = \frac{0.61 \times 550 \, nm}{0.25 \, \mu m} = 1.34 \qquad (2.4)$$

From the above it is therefore obvious that the required resolution will not be obtained by using dry lenses, because $N_{air}$ is one and from Equation (2.2) it is known that $N_{air}$ must be smaller than one. Thus, an immersion objective used with immersion oil ($n_{oil}=1.515$) or liquid with a higher refractive index must be used. For example, a Zeiss Axioplan microscope with a plane apochromatic immersion objective having a magnification of 63× and a numerical aperture of 1.4 can be employed for the microscope 10 illustrated in FIG. 2.1. This is a high-NA objective corrected for spherical aberration in four wavelengths, chromatic aberration for more than four wavelengths and for flatness of field.

2.2 Camera

The camera 12 is directly connected to the microscope 10. The camera 12 is preferably a Hitachi KP-C100 camera which incorporates a CCD (Charge-Coupled Device) solid state detector. The CCD operates by transferring packets of minority charge from one potential well to another The CCD has a two-dimensional grid of sensor elements made of silicon photodiodes. The electrons produced in each photodiode are immediately transferred to an adjoining, electrically positive potential well. The electron packets trapped in the potential wells are shifted upwards row by row, such that the top most row falls into a structure called the isolation transfer gate. Within the isolation transfer gate, the packets are shifted to the left one by one and amplified to produce an output resembling that of a raster scan system. The overall operation of CCD equipped cameras is well known in the art. The Hitachi camera produces a picture of 510×492 pixels.

The scan area of the camera is 8.8 mm×6.6 mm. Using a 63× objective, the area covered is $$A = \frac{8800}{63} \mu m \times \frac{6600}{63} \mu m \qquad (2.5)$$
$$= 140 \, \mu m \times 105 \, \mu m$$

The total number of cochlear nerve fibers that can fit into this space is about five hundred.

2.3 Image Processor

The output of the camera 12 is digitized and stored for future references and manipulations. This task is accomplished by an image processor board contained within the general purpose computer 14. Alternatively, the image processor can take the form of a separate unit coupled to the general purpose computer 14. Preferably, an Imaging Technology imaging board, Model FG-100-AT-1024, is used as the image processor, although other image processing devices may be readily employed. The FG-100-AT-1024 is a single board, real-time image processor designed to be interfaced with IBM PC-AT's and compatibles. A block diagram of the processor is shown in FIG. 2.2. The image processor digitizes the 512×480 pixel images from the camera with 8-bit precision (256 gray levels). The digitized image is passed through the feedback/input look-up table and stored in a frame memory. The frame memory is arranged as a 1024×1024 two-dimensional array of 12-bit pixels. It is therefore large enough to store 4 images at the same time. While the lower 8 bits of the pixels are usually used to store images, the upper 4 bits can be used to store other information.

The input/feedback look-up table image processor takes as input a 12-bit pixel and maps it to another 12-bit pixel. It serves two functions. It can be used for input preprocessing, and it can also be used through a feedback loop to manipulate data already present in the frame memory. This look-up table can be programmed to perform different tasks in real time.

The output circuitry of the image processor involves three look-up tables—one for each primary color. These look-up tables provide 12-bit to 8-bit mappings and can be programmed for pseudo-color processing if desired.

2.4 Computer

The general purpose computer 14 illustrated in FIG. 2.1 acts as a central control unit and also controls the operation of the image processor board described above. Preferably a Compaq Deskpro 386/25 personal computer (PC) is employed for the general purpose computer 14. The frame memory of the image processor is memory mapped to the PC which performs most of the complicated computations that the image processor cannot handle. This includes searching and other operations requiring random access of the frame memory. With careful planning, the image processor can perform selected functions in parallel with the computer. The use of a PC also facilitates the transfer of data to other software packages that are readily available. The user interacts with the computer via a keyboard and a mouse.

2.5 Output Device

The output device is provided to allow the user to view the data and the results obtained. In addition to the alphanumeric monitor of the PC, a graphics monitor and graphics printer are preferably employed. A graphics monitor capable of displaying the entire video frame is required. Because of the degradation of video images near the edges, the periphery of a video image is usually not shown on commercial TV. A monitor which can display the entire frame is said to have the underscan capability. For example, a Sony KV-1250 color monitor can be used for the graphics display.

3.0 Image Processing Techniques

A general description and review of various image processing techniques that are employed by the present invention will be presented prior to discussing the specific operational details of the invention.

3.1 Image Definition

A digital image will be defined for the purposes of describing the invention as a two-dimensional collection of points with intensity i(x,y) at coordinates (x,y). Since intensity is never negative:

$$0 \leq i(x,y) < \infty \quad (x,y)$$

For the 8-bit images with 512×480 pixels provided by the camera of the preferred embodiment:

$$0 \leq x \leq X-1$$

$$0 \leq y \leq Y-1$$

$$0 \leq i(x,y) \leq 255$$

where X=512 and Y=480.

The term "resolution" as applied to digital image processing refers to both the sampling frequency in the spatial domain and the quantization levels of each pixel. The spatial resolution in the pictures produced by the camera is 512×480. The resolution can be decreased to 256×240 by replacing every four pixels by one pixel having an intensity equal to the average of the original four in order to remove the redundancies when the magnification is too high. It is preferred, however, to control the magnification rather than the resolution so that each image contains the optimum number of fibers.

The quantization level in the pictures produced is 8-bit, or equivalently 256 gray levels. It is also possible, for example, to decrease the quantization level to 7-bits by grouping every two consecutive gray levels into one. Decreasing either the spatial resolution or the quantization levels will blur an image but will also decrease the amount of space required to store a picture. For example a 512×480, 8-bit picture requires 240 kb to store, while a 256×240, 7-bit picture requires only 52.5 kb.

Operations on an image can be classified into several categories:

Local Operations—Each pixel in the resulting image depends only on its immediate neighborhood usually the 3×3 neighborhood—in the original image (e.g. spatial domain filtering).

Regional Operations—Each pixel in the resulting image depends on the surrounding region in the original image (e.g. regional averaging).

Global Operations—Each pixel in the resulting image depends on all the pixels in the original image (e.g. Fourier Transform).

3.2 Histogram Equalization

While most image processing techniques may fall into any of the above categories, pattern recognition techniques are usually local or regional, but rarely global.

A histogram of a picture is a plot of intensity versus the frequency of occurrence. The range of intensity of a picture is often small compared to the range available on a system. In this case, it is possible to improve the contrast by using histogram equalization which has the effect of spreading out the intensity. An intensity mapping function according to which each original gray level is mapped to a new one is required to provide equalization.

For the original histogram, the function $n_o(i)$ is the number of pixels that have a gray level i. Similarly, the desired histogram will have the function $n_d(i)$. The probability density functions (PDF's) are:

$$f_d(i) = \frac{n_d(i)}{N}$$

$$f_o(i) = \frac{n_o(i)}{N}$$

where N is the total number of pixels in the picture, specifically X×Y=512×480=245760 pixels. In the ideal case:

$$f(i) = \frac{1}{I}$$

where I=256 is the total number of gray levels of the system.

Letting the cumulative distribution functions (CDF's) be then:

$$g_o(i) = \sum_{j=0}^{i} f_o(j)$$

$$g_d(i) = \sum_{j=0}^{i} f_d(j)$$

$$g(i) = \sum_{j=0}^{i} f(j) = \frac{i}{I}$$

Since it is impractical to equate $f_i$ with $f_d$, instead $g_i$ can be equated with $g_d$:

$$g_d(i) = \frac{i}{I}$$

A mapping function M is now needed such that $i_d = M(i_o)$:

$$g_d(i_d) = g_o(i_o)$$

$$i_d = g_d^{-1}(g_o(i_o))$$

Solving the above equations gives:

$$i_d = M(i_o) = \frac{I}{N} \sum_{j=0}^{i_o} n_o(j) \quad (3.1)$$

Each pixel in the original picture can now be changed to a new value based on Equation (3.1). Histogram equalization is a global process since the new value of each pixel depends on the histogram of the original picture. In the discrete case, it is irreversible because two values may be mapped into one. FIG. 3.1 illustrates an example of histogram equalization.

The two-dimensional discrete Fourier transform is:

$$F(u,v) = \frac{1}{XY} \sum_{x=0}^{X-1} \sum_{y=0}^{Y-1} f(x,y) e^{-j2\pi\left(\frac{ux}{X} + \frac{vy}{Y}\right)} \quad (3.2)$$

and f(x,y) becomes i(x,y) for an image. For examples of 2-D DFT of images see *Computer Image Processing and Recognition*, E. L. Hall, Academic Press, New York, 1979; *Digital Picture Processing*, A. Rosenfeld and A. C. Kak, Volume 1, Academic Press, Orlando, Fla., 2nd Edition, 1982; and *Signals and Systems*, A. V. Oppenheim et al., Prentice-Hall, Englewood Cliffs, N.J., 1983.

3.3 Filter Domain Filtering

To filter an image in the frequency domain requires three steps. First, the Fourier transform of the image must be obtained by directly applying Equation (3.2). Because of the separability property of the 2-D DFT, the same result can be obtained by applying the one-dimensional fast Fourier transform twice, once horizontally and once vertically. Second, a multiplication in the frequency domain must be performed to obtain:

$$G(u,v) = H(u,v)F(u,v) \quad (3.3)$$

where $H(u,v)$ is the filter. For lowpass filtering, $$H_l(u,v) = \begin{cases} 1 & \text{for } D < D_0 \\ 0 & \text{for } D > D_0 \end{cases} \quad (3.4)$$

where $D(u,v) = \sqrt{(u^2+v^2)}$ and $D_o$ is the cut-off frequency.

Similarly for highpass filtering, $$H_h(u,v) = \begin{cases} 1 & \text{for } D < D_0 \\ 0 & \text{for } D > D_0 \end{cases} \quad (3.5)$$

The final step is to perform the inverse discrete Fourier transform:

$$g(x,y) = \sum_{u=0}^{X-1} \sum_{v=0}^{Y-1} G(u,v) e^{j2\pi\left(\frac{ux}{X} + \frac{vy}{Y}\right)} \quad (3.6)$$

An algorithm that is used to compute the forward DFT can also be used to compute the inverse DFT. If the input to the algorithm were $G^*(u,v)$, the output would be $g^*(x,y)$.

3.4 Spatial Domain Filtering

In image processing, filtering in the spatial domain is more common than in the frequency domain. In the spatial domain, filtering does not require complex arithmetic, but the cut-off will not be as sharp as in the frequency domain. It is well known that multiplications in the frequency domain correspond to convolutions in the spatial domain, which means that $$g(x,y) = f(x,y) * h(x,y) = \sum_{i=0}^{X-1} \sum_{j=0}^{Y-1} f(i,j)h(x-i, y-j) \quad (3.7)$$

where $h(x,y)$ is the inverse DFT of the filer $H(u,v)$ in Equation (3.3). It should be noted that $h(x,y)$ is an $X \times Y$ array, which is too large to use as a convolution mask. Letting $h'(x,y)$ be an $n \times n$ convolution mask which is an approximation to $h(x,y)$, then $h'(x,y)$ can be obtained by minimizing the error quantity:

$$e^2 = \sum_{u=0}^{X-1} \sum_{v=0}^{Y-1} |\hat{H}(u,v) - H(u,v)|^2$$

The convolutions are often restricted to local operations by using masks having $n=3$:

$$\hat{h}(x,y) = \begin{bmatrix} \hat{h}(-1,-1) & \hat{h}(0,-1) & \hat{h}(1,-1) \\ \hat{h}(-1,0) & \hat{h}(0,0) & \hat{h}(1,0) \\ \hat{h}(-1,1) & \hat{h}(0,1) & \hat{h}(1,1) \end{bmatrix}$$

In some applications it is desirable to have $n>3$. In most instances this can be achieved by successively applying the $3 \times 3$ convolution mask. For example, $h'(x,y) * h'(x,y)$ produces a $5 \times 5$ convolution mask. The associativity property of convolution guarantees:

$$[i(x,y)*\hat{h}(x,y)]*\hat{h}(x,y) = i(x,y)*[\hat{h}(x,y)*\hat{h}(x,y)]$$

However the left hand side is more efficient in terms of the number of multiplications and additions required. If $n=3$ the right hand side requires 25 multiplications and 24 additions for any $(x,y)$ even when the $5 \times 5$ convolution mask is precalculated. The left hand side requires only 18 multiplications and 16 additions.

From Equation (3.7):

$$\begin{aligned} g(x,y) = &f(x-1, y-1)\hat{h}(1,1) + \\ &f(x, y-1)\hat{h}(0,1) + \\ &f(x+1, y-1)\hat{h}(-1,1) - \\ &f(x-1, y)\hat{h}(1,0) + f(x,y)\hat{h}(0,0) + \\ &f(x+1, y)\hat{h}(-1,0) + \\ &f(x-1, y+1)\hat{h}(1,-1) + \\ &f(x,y+1)\hat{h}(0,-1) + \\ &f(x+1, y+1)\hat{h}(-1,-1) \end{aligned} \quad (3.8)$$

Modifying Equation (3.2) for $n=3$ gives:

$$\hat{H}(u,v) = \frac{1}{9} \sum_{x=-1}^{1} \sum_{y=-1}^{1} \hat{h}(x,y) e^{-g\frac{2}{3}\pi(ux+vy)} \quad (3.9)$$

A convolution mask for lowpass filtering is $$\hat{h}_l(x,y) = \begin{bmatrix} 0.1 & 0.1 & 0.1 \\ 0.1 & 0.2 & 0.1 \\ 0.1 & 0.1 & 0.1 \end{bmatrix} \quad (3.10)$$

which is in essence a weighted averaging. It is good for removing noise but its indiscriminate use may blur the image. Combing Equation (3.9) and Equation (3.10):

$$\hat{H}_l(u,v) = \begin{bmatrix} 0.011 & 0.011 & 0.011 \\ 0.011 & 0.111 & 0.011 \\ 0.011 & 0.011 & 0.011 \end{bmatrix} \quad (3.11)$$

which verifies that $h_1'$ is a low pass filter. Note that $H_1'$ is real and even because $h_1'$ is real and even. A convolution mask for highpass filtering is:

$$\hat{h}_h(x,y) = \begin{vmatrix} -0.25 & -0.25 & -0.25 \\ -0.25 & 3.00 & -0.25 \\ -0.25 & -0.25 & -0.25 \end{vmatrix} \quad (3.12)$$

which is good for edge enhancements but it will also emphasize noise. Combing Equation (3.9) and Equation (3.12):

$$\hat{H}_h(u,v) = \begin{vmatrix} 0.361 & 0.361 & 0.361 \\ 0.361 & 0.111 & 0.361 \\ 0.361 & 0.361 & 0.361 \end{vmatrix} \quad (3.13)$$

which verifies that $h_h'$ is a highpass filter. Note that $H_h'$ is real and even because $h_h'$ is real and even.

3.5 Thresholding

Thresholding is a technique for converting a gray level picture into a binary one:

$$i_b(x,y) = \begin{cases} 0 \text{ for } i(x,y) < T \\ 1 \text{ for } i(x,y) > T \end{cases} \quad (3.14)$$

where $i_b(x,y)$ is the resulting binary image and T is the threshold level.

Thresholding is appropriate only when the picture in question consists of two distinct regions and the histogram is bimodal. In other cases, it is difficult to decide on the threshold level, particularly by automatic methods. The threshold level is manually set to the optimal level that preserves most of the boundaries of the axons. It has been found, however, that non-uniform illumination of the nerve section under study can severely hinder the success of a global thresholding. Thus, as will be described in greater detail, it is desirable to apply a variable threshold level on local properties.

4.0 Pattern Recognition Techniques

Pattern recognition techniques refer to the algorithms used to extract features from an image. The image should be fully enhanced before these techniques are implemented. It is convenient to adopt a set of notations for the attributes of an image and its components for the purposes of discussing the invention.

Pixels or points are indicated by capital letters: e.g. P, Q.

The x,y coordinates and the intensity of the pixel P are given by $P_x$, $P_y$ and $P_i$ respectively.

The Euclidean distance between two pixels is:

$$D_{PQ} = \sqrt{((P_x - Q_x)^2 + (P_y - Q_y)^2)}$$

4.1 Connectivity

Two adjacent pixels P and Q are said to be 4-connected if and only if $D_{PQ} = 1$. They are 8-connected if and only if $1 \leq D_{PQ} \leq \sqrt{2}$. See FIG. 4.1 in which the 4's and 8's denote the 4-connected and 8-connected neighbors of P. The terms 4-neighbors and 8-neighbors refer to the points that are 4-connected and 8-connected respectively.

The distance between 4-neighbors is always equal to 1 unit. However, the distance between 8-neighbors can be either 1 or $\sqrt{2}$ units. In some applications, it is more convenient to assume that the distance between two diagonally connected 8-neighbors is also 1.

4.2 Edge Detection

In most images the information is contained in the edges—locations where there is an abrupt change in intensity. For this reason edge detection is frequently used. In some applications, however, it has been found that edge enhancement may have an adverse effect.

The gradient of an image is defined to be:

$$G[i(x,y)] \equiv \begin{bmatrix} \frac{\partial i(x,y)}{\partial x} \\ \frac{\partial i(x,y)}{\partial y} \end{bmatrix} \quad (4.1)$$

While the gradient is a measure of the change in intensity, the Laplacian is a measure of the rate of change in intensity. Since the edges in an image are located at points where the second derivative of intensity passes through zero, the Laplacian of an image shows the edges.

4.3 Segmentation

Segmentation refers to the techniques used to divide a picture into regions with each region representing a feature of a considerable portion thereof. There are many methods to segment a picture including:

Merging—First consider all the pixels to be in a different region. Then merge adjacent pixels if they pass a homogeneity test. Apply this method repeatedly until no more merging occurs.

Splitting—Unlike merging consider all the pixels to be in the same region. Then perform a homogeneity test on each of the four triangular subsection of the region. Split the subsection into another four triangles if the test fails. Repeat until no more splitting occurs.

Split-and-Merge—Even better results can be obtained if merging is performed following splitting.

A major drawback of the conventional segmentation algorithms is that they require a tremendous amount of computer memory. If R is the number of different regions and N the number of pixels in a picture, the amount of memory required to store this information is $N/8\log_2 R$ bytes. For $512 \times 480$ pictures, at least 537 kb would be required for merging. Splitting and split-and-merge may require less memory. The amount of memory that we just discussed is the minimum required to hold the information.

An efficient implementation of the above algorithms requires a much larger amount of memory. A reasonably efficient data structure would be to store the coordinates of the pixel belonging to the same region in a linked list. This would require 8 bytes per pixel or 1.875 Mb. Also the recursive methods discussed may cause stack overflows. As a result, the use of these methods is confined only to small regions.

4.4 Thinning

Thinning refers to the techniques used to convert an object into its skeleton while preserving its connectivity, symmetry and shape. It is often used to reduce line images to unit line width which can be represented easily. It only makes sense to perform this operation when the object is reasonably elongated.

The minimum t such that $S^{-t}$ is empty can be a measure of the thickness of an object. The elongatedness of an object is defined to be:

$$E = \frac{A_2}{t} \quad (4.8)$$

where A is the area of the object.

Thinning algorithms should not be used if E is small. Most thinning algorithms repeatedly remove border points from the object based on some criteria depending on the application until no more removal occurs.

4.5 Mathematical Morphology

Mathematical morphology is an approach to image processing which is based on the shape of the objects processed. The following discussion is based on the concepts presented by Haralick et al. described in "Image Analysis Using Mathematical Morphology", R. M. Haralick et al., IEEE Transactions on Pattern Analysis and Machine Intelligence, PAMI 9:532-550, 1987, but the equations have been reformulated based on Boolean arithmetic instead of set arithmetic to facilitate the conversion to computer programs. The following logical operations will be used: ∩ represents OR, ∪ represents AND, and —represents NOT.

4.5.1 Dilation

Dilation is an operation that spreads out the marked pixels and has the effect of reducing noise and filling small holes. Let x(x,y) and b(x,y) be two binary images, then $$a(x,y) \oplus b(x,y) \equiv \sum_{i=0}^{X-1} \sum_{j=0}^{Y-1} a(i,j) \; b(x-i, y-j) \quad (4.9)$$

where ⊕ is the dilation operator.

FIG. 4.2 shows an example of dilation.

4.5.2 Erosion

Erosion is an operation that contacts the marked pixels and has the effect of thinning the object and expanding holes. Let a(x,y) and b(x,y) be two binary images, then $$a(x,y) \ominus b(x,y) \equiv \sum_{i=0}^{X-1} \sum_{j=0}^{Y-1} a(i,j) \; b(i-x, j-y) \quad (4.10)$$

where ⊖ is the erosion operator. FIG. 4.3 shows an example of erosion.

The most common dilation and erosion operations have as input an image and a structuring element known as the dilation or erosion mask. The shape of the structuring element known as the dilation or erosion mask depends on the application.

4.5.3 Opening and Closing

Dilation and erosion are often performed in pairs. Calling the structuring element k(x,y) and the image i(x,y) then:

$$i(x,y) \odot k(x,y) \equiv (i(x,y) \ominus k(x,y)) \oplus k(x,y) \quad (4.11)$$

where ⊙ is the opening operation. and $$i(x,y) \otimes k(x,y) \equiv (i(x,y) \oplus k(x,y)) \ominus k(x,y)$$

where ⊗ is the closing operation. (4.12)

4.6 Blob Counting

Blob counting usually refers to the techniques of locating marked objects and obtaining information about them. Assume that the pixels in the objects all have value 1 and the background pixels all have value 0. The technique for locating the objects is well known. The image is scanned until an object pixel (which is the starting pixel for boundary tracing) is encountered. The boundary is traced by turning left when reaching an object pixel and turning right otherwise until one arrives back at the starting pixel. This procedure will trace the object in a clockwise manner. It is essential to mark the boundary pixels as visited so that this object will be ignored in the next scan.

A convenient way to keep track of the shape of an object during boundary tracing is to use the chain code representation, wherein each time an object pixel is reached, it is considered that a movement has occurred from the previous object pixel:

A move right is coded as 0 and stored in the chain

A move down is coded as 1 and stored in the chain

A move left is coded as 2 and stored in the chain

A move up is coded as 3 and stored in the chain

It has been found that the method described by Ballard and Brown in *Computer Vision* has a slight flaw which may give an incorrect result when part of the object is 1 pixel thick. For example when tracing a vertical line of 1 pixel thick, it is possible to return to the starting pixel from the other side of the line. Thus, one must make sure that one returns to the starting pixel on the starting side to consider the procedure finished. This can be done by having an additional constraint—The tracing is completed if a return to the starting pixel occurs and the chain code is either 0 or 3.

The perimeter and area of the object can be easily obtained from the chain code. The perimeter is simply the number of elements in the chain. In order to calculate the area we start by initializing the area to 0 and keep track of the y-coordinate as we traverse the chain:

Chain code 0: subtract the value of y from the cumulative area

Chain code 1: increment the value of y

Chain code 2: add the value of y to the cumulative area

Chain code 3: decrement the value of y

4.7 Correlation

The similarity of a some function g(x,y) to f(x,y) can be checked by defining the dissimilarity to be:

$$D(f,g) = \sum_{x=0}^{X-1} \sum_{y=0}^{Y-1} [f(x,y) - g(x,y)]^2 \quad (4.13)$$

$$= \underbrace{\sum_{x=0}^{X-1} \sum_{y=0}^{Y-1} [f(x,y)]^2 + \sum_{x=0}^{X-1} \sum_{y=0}^{Y-1} [g(x,y)]^2}_{\text{constant}} - \underbrace{2 \sum_{x=0}^{X-1} \sum_{y=0}^{Y-1} f(x,y) g(x,y)}_{S(f,g)}$$

where S(f,g) is a measure of similarity.

In order to search for an object g(x,y) with a prior knowledge of its shape in f(x,y), the most reliable method is to conduct an extensive search for the x and y coordinates that would maximize the cross-correlation function:

$$f(x,y) \circ g(x,y) = \sum_{i=0}^{X-1} \sum_{j=0}^{Y-1} f^*(i,j) g(x+i, y+j) \quad (4.14)$$

f*(x,j) would just become f(i,j) for images. When matching different objects in the picture, and since g(x,y) is not constant as shown in Equation 4.13, a normalized cross-correlation function must be employed:

$$f(x,y) \circ g(x,y) = \frac{\sum_{i=0}^{X-1} \sum_{j=0}^{Y-1} f^*(i,j)g(x+i, y+j)}{\sqrt{\sum_{i=0}^{X-1} \sum_{j=0}^{Y-1} [g(i,j)]^2}} \quad (4.15)$$

4.8 Hough Transform

The Hough transform is another way to locate features in an object. Its most common use is to detect straight lines, but it can be generalized to detect arbitrary shapes. The approach is to tally the points in the parameter space. For example, in order to detect straight lines in a noisy image, one could mark the corresponding point in the slope intercept space (mc-space) for each object point identified in an image based on the equation $y = mx + c$. The maximum points in the mc-space indicate a possibility broken straight line.

The same idea can be used for the detection of circles, only now the parameter space would be three-dimensional with $x_o$, $y_o$, and r from the circle equation $(x-x_o)^2 + (y-y_oO)^2 = r^2$. This means that the space requirement would be tremendous. If it is assumed $0 \leq x_o \leq 511$, $0 \leq y_o \leq 479$, and $0 \leq r \leq 255$, reserving one byte per voxel for the tallies, the space requirement would be 60Mb.

5.0 System Operation

The above-described image processing techniques are employed by the system illustrated in FIG. 2.1 to count and extract data from the histological slides. The procedures involved are listed in Table 5.2. For illustrative purposes, the slide shown in FIG. 1.1 will be used unless otherwise stated. The system is capable of operating in three modes (MANUAL, AIDED and AUTO), as will be described in greater detail below.

5.1 Statistics Generated

The first step implemented by the system of FIG. 2.1 is the derivation of the statistics regarding axon area (AA), myelin sheath thickness (MT) and eccentricity (EC). Statistics about total fiber area (TA), fiber perimeter (FP), and myelin sheath area (MA) are also included.

Each fiber is represented by a set of axon pixels and a set of myelin pixels. The fiber perimeter (FP) is traced using blob counting. Its value is calculated based on 8-connectivity, and is therefore incremented by the square root of two units for each diagonal move and by one unit for each non-diagonal move. The other values are calculated as follows:

$$\text{Total Area} = TA = AA + MA \quad (5.1)$$

$$\text{Myelin Thickness} = MT = \sqrt{\frac{TA}{\pi}} - \sqrt{\frac{AA}{\pi}} \quad (5.2)$$

$$\text{Eccentricity} = EC = \frac{FP^2}{TA} \quad (5.3)$$

Eccentricity allows one to differentiate between circular and non-circular fibers. The minimum eccentricity is that of a perfect circle which is $4\pi = 12.6$. Other shapes have higher eccentricities A perfect square, for example, has an eccentricity of 16. It is possible, however, for the calculated eccentricity of an object represented on a digital grid to be lower than $4\pi$. It would be expected that the eccentricity of an object displayed on a digital grid would be higher than that of its analog counterpart since a circle will no longer be circular on a digital grid. The problem is that even though the area is generally accepted to be the number of pixels the object occupies, the perimeter is not well defined. Some define the perimeter to be the number of boundary pixels. But this definition depends on whether we consider 4-connectivity or 8-connectivity. The definition of perimeter as employed by the present invention, and as described before, tends to give values close to $4\pi$ for circular objects. The difficulty of defining eccentricity and perimeter is even greater for small objects.

It is important to note that the myelin sheath thickness is calculated from the axon area and myelin sheath area assuming that both the axon and the fiber are perfectly circular. It should also be noted that all of the parameters can be calculated when given the axon area, myelin sheath thickness and eccentricity. Histograms of all these parameters are generated by the system of the present invention.

5.2 Manual Mode

The MANUAL mode of operation of the system is the least sophisticated mode of operation, but it gives the user the maximum amount of flexibility. The user uses a mouse to trace out the axon and the myelin sheath boundaries and the computer 14 is utilized to obtain the desired statistics. More specifically, the user selects a region of the slide displayed on the monitor and an enlarged view of the selected region is displayed as shown in FIG. 5.1. The user places the cursor on an axon boundary, activates the mouse and proceeds to trace the axon boundary of a nerve fiber. Upon returning to the initial starting point, the computer calculates the axon area from the traced boundary and colors in the axon area, for example with yellow, to indicate to the user the completion of this step. The user then traces the myelin sheath boundary in a similar fashion and the computer calculates the myelin sheath area and colors it green. FIG. 5.1 illustrates the intermediate step where the user has already traced out the axon boundary and is in the process of completing the myelin sheath boundary. Four other fibers have already been counted.

It is readily apparent that the MANUAL mode of operation is very time consuming. The user must trace the axon and myelin boundary for each fiber. The computer 14 simply calculates the axon and myelin sheath areas by determining the number of pixels within the boundaries defined by the user. The MANUAL mode of operation, however, does provide the ability to fill the region when given a boundary that is traced either clockwise or counterclockwise. The points on the boundary are stored in a linked list called boundary list and the computer 14 performs the following procedures to fill the region:

1. Eliminate repeated points in boundary list.
2. For every pair of points in boundary list, retain only the point with the smaller y-coordinate. If the points have the same y-coordinate, then keep both and create a duplicate pair, for example:

$$\ldots \rightarrow (x_1,y) \rightarrow (x_2,y) \rightarrow \ldots$$

becomes $$\ldots \to (x_1,y) \to (x_1,y) \to (x_2,y) \to (x_2,y) \to \ldots$$

3. Sort the boundary list in ascending order according to the value $y \times 1 + x$ where $1 = 512$ is the horizontal window size.

4. For every pair of points in boundary list that have the same y-coordinate, draw a line between them if this was not done for the last pair of points.

5.4 Aided Mode

The AIDED mode of operation is similar to that described by Geckle and Jenkins discussed above. It is not totally automatic but requires an operator to identify the fibers. In order to count a fiber, the operator uses the mouse to manually position the cursor at the center of the fiber. The computer 14 then automatically fills in the interior of the fiber and keeps track of the perimeter and area. Unlike Geckle and Jenkins, who employ a variation of the blob counting technique, an algorithm known as region growing is employed.

Region growing is a rather general term. A more specific term for the procedure described is "flood fill"—which is usually used in the context of computer graphics. Region growing requires some starting point from where the region grows. Each pixel in the region expands into its 4-neighborhood if the neighbor satisfies some properties. Since the axons appear to be brighter than the myelin sheaths, it can be assumed that the region will be bounded by dark pixels. The average intensity of the local $20 \times 20$ grid is calculated. Pixels with intensity lower than this average are considered to be boundary pixels.

There are two ways to implement region growing. An easy and straight forward method is to use recursion. This has been proved to be inappropriate on the PC because of its limited stack size. Stack overflows occur frequently because recursive calls fill up the stack rather quickly. Instead, the system according to the present invention maintains the locations of the outer pixels of the growing region in a linked list. Pixels which have been determined to be non-expandable, that is, those whose 4-neighbors are all boundary pixels, will be deleted from the list. Expansion continues until the list becomes empty.

Table 5.1 provides a comparison of the two methods. Region growing searches for the boundary symmetrically in all directions while blob counting follows the boundary.

|  | Region Growing | Blob Counting |
| --- | --- | --- |
| Time | $O(N^2)$ | $O(N)$ |
| Space | $O(N^2)$ | $O(N)$ |
| Symmetry | Good | Poor |
| Reliability | Excellent | Fair |

This means that the computational time for region growing increases with the area while that of blob counting increases with the perimeter. This makes blob counting more efficient. However, when the radius of the search area is small, the computational advantage of blob counting is not that great. The average radius of the fibers that are counted in the present application of the system is only about 5 pixels. This advantage is also lessened by the fact that the computational time for either of these method is much longer than the time required by the operator to place the mouse at the center of each fiber.

The reason for using region growing is the fact that the boundaries of many fibers are not nicely connected. The entire interior of the fiber could be filled before "leaking" occurs. This means that there is a chance to stop the operation just before the leaking and still have the filled area, which corresponds to the axon area, measured. Blob counting, on the other hand, will not be able to handle the case when there are discontinuities in the boundary because the area cannot be measured until the whole boundary is traced.

The AIDED mode of operation also allows the user to limit the search area to a grid smaller than the default $20 \times 20$. Limiting the grid size has two effects: 1) it limits the search area to prevent leaking, and 2) it makes the calculation of the local average intensity more accurate. The user is also permitted to repetitively delete the last fiber counted if an error is detected or randomly to delete any counted fiber. The procedure is illustrated in FIG. 5.2 which shows a magnified region of a partially counted section.

Problems arise when processing a fiber which touches another one. The myelin sheath area will sometimes grow towards the neighboring fiber. To solve this problem, one must restrict the growing of the myelin sheath area to pixels which have lower intensity than the average, but also only allow pixels to grow to a neighbor having a lower intensity. However, it is not uncommon that the traced object will still contain unwanted protrusions (illustrated by FIG. 5.3(a)) which can be eliminated by the computer performing a five step process of:

1. Using erosion to disconnect the neighboring fiber.
2. Using region growing to retrieve the area that is not disconnected.
3. Using dilation to balance the effect of the first erosion.
4. Using dilation to smooth discontinuities in the fiber boundary, and
5. Using erosion to balance the effect of the second dilation.

The fourth and the fifth steps essentially comprise a closing operation. For the dilation and erosion, a 3 by 3 square shape structuring element is used Steps 1–5 above are respectively illustrated in FIGS. 5.3(b)–(f).

5.4 Auto Mode

The AUTO mode of operation is in many ways similar to AIDED mode. The main and significant difference is that AUTO does not require operator assistance in the fiber identification process. In AIDED, the operator points out where the fibers are and this prevents the computer from performing an extensive search of the image in order to locate all the possible structures. The AUTO mode has to perform this search and most importantly, it has to be fast and accurate.

The following process steps are performed by the computer 14 in the AUTO mode of operation:

1. Identification of all the possible locations of the fibers.
2. Elimination of the false identifications of step 1 by thoroughly checking the neighborhood of the possible locations.
3. Measurement of the structures that have been determined to be fibers.

5.4.1 Preprocessing

Prior to performing the above steps, the digitized image should be preprocessed to produce a lowpass and highpass version using the image techniques described above. The highpass version with enhanced edges is used in the fiber detection process. The lowpass version with spikes removed is used in the location of axon and myelin sheath area.

The image should also be corrected geometrically because the aspect ratio of the digitizing system is 4:3. This means that a circular fiber is not really circular in the frame memory, but the horizontal diameter is 0.75 of the vertical diameter. The image is corrected by shrinking the image in the y direction:

$$i(x,y) = \frac{3 - (y \bmod 4)}{4} i_o(x, \lfloor 1.33y \rfloor) + \frac{1 + (y \bmod 4)}{4} i_o(x, \lceil 1.33y \rceil) \quad (5.4)$$

where $i_o(x,y)$ and $i(x,y)$ are the original and corrected image respectively.

5.4.2 Locating Local Maxima

The local maxima of the image are obtained by the computer 14 after preprocessing is completed. Local maxima are pixels with higher intensity than the neighboring pixels, representing either the bright regions that are at the center of the fibers or the inter-fiber holes. It is reasoned that, since the axon area is brighter than the myelin sheath area, there must be at least one, but possibly several, local maxima located therein.

A local maximum is defined to be a point (x,y) in an image i(x,y) such that the following conditions are met:

$$i(x,y) \geq i(x-1,y-1)$$
$$i(x,y) \geq i(x,y-1)$$
$$i(x,y) \geq i(x+1,y-1)$$
$$i(x,y) \geq i(x-1,y)$$
$$i(x,y) > i(x+1,y)$$
$$i(x,y) > i(x-1,y+1)$$
$$i(x,y) > i(x,y+1)$$
$$i(x,y) > i(x+1,y+1)$$

The definition of local maximum insures that only one pixel would be identified as a local maximum even if there is a region of constant maximum intensity. The typical number of local maxima in an image is about 3,000 in the present application. An example of the obtained local maxima, indicated as black dots, is shown in FIG. 5.4.

5.4.3 Variable Thresholding

Thresholding is usually successful when the image in question has a bimodal histogram, in which case the threshold value would be the intensity corresponding to the trough of the histogram. The histogram of the sample image is shown in FIG. 3.1(b) which is clearly unimodal. However, thresholding can still be done using a variable threshold—a threshold that changes with location.

It is assumed that the axon area has higher intensity and myelin sheath area has lower intensity than the average. In other words, the threshold value is the local average. Unfortunately, calculating the average for each point is a time consuming process. Instead, it is possible to calculate the average for 221 equally spaced grid points arranged in a 17×13 network. This separates the image into 192 regions of size $\Delta x \Delta y$. To calculate the average for any point in the image, the system need only to interpolate from the 4 closest grid points whose average have already been determined.

For example, let $(x_0,y_0)$ be the point for which the system is trying to calculate the average; $x_1,x_2$ are the left and right boundaries of the region respectively; $y_1,y_2$ are the top and bottom boundaries of the region, respectively; and $i_{jk}$ is the average at $(x_j,y_k)$. Then the average is:

$$i = (A\delta x + B)\delta y + C\delta x + D \quad (5.5)$$

where $$A = \frac{i_{22} - i_{12} - i_{21} + i_{11}}{\Delta x \Delta y}$$

$$B = \frac{i_{12} - i_{11}}{\Delta y}$$

$$C = \frac{i_{21} - i_{11}}{\Delta x}$$

$$D = i_{11}$$
$$\delta x = x - x_1$$
$$\delta y = y - y_1$$

Note that A, B, C, and D only need to be calculated once for each region.

The proof of equation 5.5 is based on dividing the screen of the monitor into 16×12 regions of size $\Delta x X \Delta y = 32 \times 30$ pixels. Altogether there are 17×13 corner points, for each of which the local average intensity is calculated by averaging the local $\Delta x X \Delta Y$ pixels. To calculate the local average intensity of any point on the screen, it must first be determined to which of the 16×12 regions the point belongs. FIG. 5.5 shows one of the 16×12 regions. The local average intensities at $(x_1,y_1)$, $(x_2,y_1)$, $(x_1,y_2)$ and $(x_2,y_2)$ are known, as they are one of the 17×13 corner points. Both i and $i_2$ are approximated by interpolation:

$$\frac{i_1 - i_{11}}{i_{21} - i_{11}} = \frac{\delta x}{\Delta x}$$

$$i_1 = \frac{(i_{21} - i_{11})\delta x}{\Delta x} = i_{11}$$

$$i_2 = \frac{(i_{22} - i_{12})\delta x}{\Delta x} - i_{12}$$

and therefore, $$i_2 - i_1 = \frac{(i_{22} - i_{12} - i_{21} - i_{11})\delta x}{\Delta x} + i_{12} - i_{11}$$

By the same principle, but applied in the y direction, i is obtained by interpolation, $$i = \frac{(i_2 - i_1)\delta y}{\Delta y} + i_1$$

$$= \frac{(i_{22} - i_{12} - i_{21} + i_{11})\delta x \delta y}{\Delta y} + \frac{(i_{12} - i_{11})\delta y}{\Delta y} +$$

$$\frac{(i_{21} - i_{11})\delta x}{\Delta x} + i_{11}$$

$$= \left( \underbrace{\frac{(i_{22} - i_{12} - i_{21} + i_{11})}{\Delta x \Delta y}}_{A} \delta x + \underbrace{\frac{i_{12} - i_{11}}{\Delta y}}_{B} \right) \delta y +$$

$$\underbrace{\frac{i_{21} - i_{11}}{\Delta x} \delta x}_{C} + \underbrace{i_{11}}_{D}$$

Thus, each of the 16×12 regions is characterized by its own A, B, C, D.

The resulting image using the threshold calculated this way may still have some discontinuities in myelin sheath boundaries. These discontinuities are closed by a closing operation using a 2 by 2 square shaped structuring element. A thresholded image is shown in FIG. 5.6.

5.4.4 Refining Local Maxima

The number of local maxima at this point may be quite large. An effective way to eliminate some of them is to compare the location of the local maxima with the thresholding image. We assume the axon areas to be above the threshold value and therefore the local maxima that are located at a point where the intensity is below the average can be eliminated.

It should be noted that the information about the local maxima is binary, that is, a point is either a local maximum or not. The thresholded image is also binary, each point is either above or below the threshold. This means that the system can store the local maxima bit by bit in an array, each bit representing one point. The bit is set to one if the point is a local maxima or to zero if the point is not a local maxima. The system stores the threshold image similarly in an array, wherein a bit is 1 if the intensity corresponding to that point is above the threshold and 0 otherwise. This is very space efficient—only 32 KBytes for each array. Moreover, the local maxima refinement procedure is simply a bitwise AND operation of the local maxima and the thresholded image arrays, which require less than one second to complete.

5.4.5 Blob Coloring

The threshold image (FIG. 5.6) clearly shows that the image is segmented into regions. Some of which correspond to fiber areas and some to inter-fiber holes. The goal is to extract those that correspond to fiber areas. It is necessary, however, to locate all of the segmented regions first. This poses a difficult problem because the space requirement to represent the segmented regions must be considered as discussed above.

It is impossible to store the locations of all the points belonging to a certain region, but it is possible to indicate to which region a certain point belongs. This technique is known as blob coloring. The computer assigns the same color to each point that belongs to the same region. The color is just a value in the image frame memory. The interpretation of the value in the image frame memory depends on the operation. For example, for a black and white display monitor, this value represents intensity or brightness. For blob coloring, this value represents the region to which the pixel belongs. The term "blob coloring" is used because an effective way to display the different regions of the image is to use a different color for each region. In the context of blob coloring, a color is just a value which is stored in the image from memory; a pixel having a value k belongs in region k. If a 12-bit image frame memory is employed, one can have at most 4096 different regions, one of which is reserved to represent the background.

The system starts blob coloring at a local maximum because every fiber has at least one local maxima. For each local maximum, the region growing procedure is used, letting it grow up to the thresholded boundary. Then the system lets it grow into the myelin sheath area. The system then colors the region as it grows, using a different color for each local maximum, and making sure that it doesn't grow into a region that has already been colored.

The resulting number of regions is always less than the number of local maxima. This is because the regions that are determined to be too big (by comparison to a predetermined limit) probably do not belong to a fiber and are discarded. Regions that have extremely high eccentricity (>40) are also thrown away. Furthermore, it is not unusual that several local maxima are located in the same region, in which case only one region results.

The result of blob coloring is that many regions are connected to many other regions. For reasons that will be explained below, it is desirable to obtain blobs that correspond to fibers connected to interfiber holes, but not to other fibers. As shown in FIGS. 5.7(a)–(b), the fiber-fiber contact area is smaller than fiber-hole contact area. To eliminate fiber-fiber contacts while preserving fiber-hole contacts, colored pixels which have neighbors of more than two colors are deleted. This procedure is similar to erosion but there is no structuring element and the deletion is more selective. The system performs this "selective erosion" twice, each time possibly deleting one pixel from each end.

If the model shown in FIGS. 5.7(a)–(b) were correct and the fibers, radii were 5 pixels, then (through geometric calculations) it could be shown that the fiber-hole contact length would be about 5 pixels —one-sixth the circumference of a circle with radius equal to 5 pixels. This means that the fiber-hole contact would still exist after selective erosion, but but the fiber-fiber contact would be eliminated. An image of a nerve section after blob coloring is shown in FIG. 5.8.

5.4.6 Symbolic Constraint Propagation Operation

To eliminate blobs which represent holes, it can be assumed that holes usually have more neighbors than do fibers. This is simply because of the fact that holes are more irregular. In addition, since most of the neighbors of a fiber are holes, some of which have already been eliminated in the blob coloring procedure, the number of neighbors next to a fiber is small.

First, the computer sets up an adjacency list for each region. An adjacency list is a linked list containing the neighbors of a region. For example, the adjacency list for region o in FIG. 5.7 contains p, q and r; the adjacency list for region p contains o, etc. Once the adjacency lists of the regions have been created, the blob colored, the blob colored image is no longer be needed. Given a region, the computer can look up the adjacency list to find out how many neighbors it has and who they are. Regions are eliminated based on a set of criteria. This is done until all the remaining regions have either zero or one neighbor. Regions which have zero neighbors will be considered to be a fiber and will not affect the elimination process of the other regions in any way.

Regions which have only one neighbor are very likely to be a fiber. It is desirable to delete the only neighbor of a region, because that would make that region a fiber. On the other hand, regions with many neighbors are likely to be holes. It would be even more desirable to delete the only neighbor of a region if that neighbor, in turn, has many neighbors.

The elimination process uniquely utilizes eccentricity to eliminate blob regions that do not represent axons, as follows:

1. If all of the remaining regions have 0 or 1 neighbors, then go to step 4.

2. If there aren't any regions that have only one neighbor, delete the region with the largest number of neighbors. If there is a tie, delete the one with the highest eccentricity. Then go back to step 1.

3. Select from the regions which are neighbors of regions which have only one neighbor, the one with the most number of neighbors for deletion. If there are several regions that fit this category, select the one with the highest eccentricity. Then go back to step 1.

4. Two types of blobs will be obtained at the end of this procedure—blobs which have no neighbors, and pairs of blobs which are neighbors of each other. In the latter category are usually fiber-fiber pairs, or fiber-hole pairs, but almost never a hole-hole pairs. Therefore, it must be decided whether to keep both, or to discard one of the blobs. The decision is based on the eccentricities of the regions. If both of the regions have lower eccentricity than 14 then keep both. Otherwise, delete the blob with the higher eccentricity. This is the last step of the fiber identification process.

It should be noted that the eccentricity of 14 was picked through experimentation. An eccentricity of 14 appeared to give the best results. However, there is only a slight change in accuracy from eccentricities ranging from 13 to 18.

At this point, the system identifies and counts the fibers by a set of local maxima which correspond to the remaining blobs. This set of local maxima is used as the starting points for the location of the axon and myelin sheath areas using region growing as described above with respect to the AIDED mode of operation. The only modification is that the average used is the one obtained from interpolation. The result is shown in FIG. 5.9.

5.4.7 Time Efficiency

Measures have been taken to improve the time required by the system to perform the AUTO mode. The most important one is the extensive use of the feedback look-up table of the imaging board. This increases the speed of several procedures like dilation, erosion and local maxima location. Table 5.2 shows the major steps of AUTO mode and the percentage of time spent on each procedure. The most time consuming step is blob coloring which takes almost 50% of the total time required. Thus, a logical approach to improving the efficiency of system operation would be to further optimize the blob coloring procedure.

6.0 Results

FIG. 6.1 is a table which illustrates the results obtained from the system illustrated in FIG. 2.1 in the MANUAL, AIDED and AUTO modes of operation. The time required for the MANUAL mode of operation ranged from 110 to 230 minutes depending on the skill of the operator. The time required for the AIDED mode of operation ranged from 16-25 minutes. The AUTO mode of operation, however, counted the number of fibers in the sample cross-section and determined axon area, myelin sheath thickness and eccentricity within 4.8 minutes, a vast improvement over the MANUAL and AIDED modes of operation.

FIG. 6.2 is a table which illustrates the analyses of six histological sections using the AUTO mode of operation—three from normal nerve and three from electrically stimulated nerves. There is an observable difference in axon area between normal and stimulated fibers; however, it is unclear where along the cochlear nerve the axial sections were taken, and since the size of the fibers depends on their origins in the cochlea, it cannot be concluded from this data that the smaller average axon area in the stimulated nerves is a result of electrical stimulation.

Of the six basic parameters generated in the AUTO mode of operation (illustrated in FIGS. 6.3($a$)–($f$) for the image shown in FIG. 1.2), only eccentricity, which is unitless, does not depend on the size of the objects. The fiber eccentricity of stimulated nerves is higher than that of normal ones, but only on the order of 1.5% to 3.2%. This could be sufficient, however, to indicate damage to the stimulated nerves, as statistical analysis has shown that there is only a 5% probability that the finding of a true average increase in eccentricity between 1.5% and 3.2% is incorrect.

The invention has been described with reference to certain preferred embodiments thereof. It will be understood, however, that variations and modifications can be made within the scope of the appended claims.

What is claimed is:

1. A method of determining characteristics of nerve fibers, said method comprising the steps of: generating digital image data representative of an image of a nerve fiber cross-section using an electronic camera; storing said digital image data in a storage unit; accessing said digital image data from said storage unit and locating local maxima of said digital image data with a control unit; performing a variable thresholding operation on said digital image data; refining said local maxima; defining a plurality of blob image regions using blob coloring; performing an elimination operation to identify which of said plurality of blob image regions represent nerve fibers.

2. A method of determining characteristics of nerve fibers as claimed in claim 1, further comprising the step of calculating at least one of the axon area, the myelin sheath area, the fiber area, the myelin sheath thickness, the fiber perimeter and the fiber eccentricity of the blob image regions that represent nerve fibers.

3. A method of determining characteristics of nerve fibers as claimed in claim 1, further comprising the step of counting the number of blob image regions that represent nerve fibers.

4. A method of determining characteristics of nerve fibers as claimed in claim 1, wherein said local maxima are defined as a point (x,y) in an image i(x,y) such that the following conditions are met:

$i(x,y) \geq i(x-1, y-1)$ $i(x,y) \geq i(x, y-1)$ $i(x,y) \geq i(x+1, y-1)$ $$i(x,y) \geq i(x-1,y)$$

$$i(x,y) > i(x+1,y)$$

$$i(x,y) > i(x-1,y+1)$$

$$i(x,y) > i(x,y+1)$$

$$i(x,y) > i(x+1,y+1)$$

5. A method of determining characteristics of nerve fibers as claimed in claim 1, wherein said step of performing a variable thresholding operation includes the step of determining a plurality of local average intensities corresponding to regions of said image.

6. A method of determining characteristics of nerve fibers as claimed in claim 5, wherein said step of determining local average intensities comprises interpolation.

7. A method of determining characteristics of nerve fibers as claimed in claim 5, wherein said step of performing a variable thresholding operation comprises the further step of interpolating among said local average intensities corresponding to regions of said image.

8. A method of determining characteristics of nerve fibers as claimed in claim 1 comprising the further step of obtaining an eccentricity of said blob image regions and eliminating blob image regions as not representing axons based on eccentricity thereof.

9. A method of determining characteristics of nerve fibers, comprising the steps of:
generating digital image data representative of an image of a nerve fiber cross-section using an electronic camera; storing said digital image data in a storage unit; accessing said digital image data from said storage unit and locating local maxima of said digital image data with a control unit; performing a variable thresholding operation on said digital image data; refining said local maxima; defining a plurality of blob image regions using blob coloring; and performing an elimination operation to identify which of said plurality of blob image regions represent nerve fibers,
wherein said step of performing an elimination operation includes the steps of a) determining how many neighbors each of said blob image regions has and terminating the elimination operation when each of said blob image regions has only one or zero neighbors, b) deleting the blob image region with the largest number of neighbors, if there are no regions having only one neighbor, c) selecting from the blob image regions which are neighbors of blob image regions having only one neighbor and deleting the one with the most number of neighbors, and d) repeating steps a), b) and c).

10. A method of determining characteristics of nerve fibers as claimed in claim 9, wherein step a) includes the step of identifying an eccentricity of said blob image regions and deleting a blob image region having a highest eccentricity if there are two blob image regions with the same number of neighbors and step c) includes the step of deleting the blob image region with the highest eccentricity if there are two blob image regions having the same number of neighbors which are neighbors of blob image regions having only one neighbor.

11. A method of determining characteristics of nerve fibers as claimed in claim 10, further comprising the step of identifying pairs of blob image region which are sole neighbors of each other and deleting the blob image region of each pair of blob image regions that has the higher eccentricity of the pair if that blob image region has eccentricity higher than 14.

12. A method of determining characteristics of nerve fibers as claimed in claim 10, further comprising the step of identifying pairs of blob image regions which are sole neighbors of each other and keeping both blob image regions if both blob image regions have eccentricities lower than 14.

13. In a method of measuring diameters of nerve fibers using image analysis, the improvement comprising the steps of:
obtaining an eccentricity characteristic for a plurality of blob image regions and
eliminating blob image regions as not representing nerve fibers based on the eccentricity characteristics thereof.

14. The method of claim 13 wherein said eliminating step comprises the steps of determining a number of neighbors for each blob image region has, deleting a blob image region having a highest eccentricity if there are two blob image regions with the same number of neighbors and deleting the blob image region with the highest eccentricity if there are two blob image regions having the same number of neighbors which are neighbors of blob image regions having only one neighbor.

15. The method of claim 13 comprising the step of using blob coloring to define said blob image regions.

* * * * *